United States Patent
Nunome et al.

(10) Patent No.: US 12,177,011 B2
(45) Date of Patent: *Dec. 24, 2024

(54) TERMINAL AND COMMUNICATION METHOD FOR BLIND-DECODING SCHEDULING INFORMATION

(71) Applicant: Panasonic Intellectual Property Corporation of America, Torrance, CA (US)

(72) Inventors: Tomoya Nunome, Ishikawa (JP); Hidetoshi Suzuki, Kanagawa (JP); Ayako Horiuchi, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/488,698

(22) Filed: Oct. 17, 2023

(65) Prior Publication Data

US 2024/0048267 A1   Feb. 8, 2024

Related U.S. Application Data

(63) Continuation of application No. 17/257,081, filed as application No. PCT/JP2019/014928 on Apr. 4, 2019, now Pat. No. 11,831,426.

(30) Foreign Application Priority Data

Aug. 9, 2018  (JP) ................................ 2018-149914

(51) Int. Cl.
*H04L 1/00*   (2006.01)
*H04L 5/00*   (2006.01)
(Continued)

(52) U.S. Cl.
CPC ............ *H04L 1/0038* (2013.01); *H04L 5/001* (2013.01); *H04L 27/26025* (2021.01); *H04W 72/1263* (2013.01)

(58) Field of Classification Search
CPC . H04L 1/0038; H04L 5/001; H04L 27/26025; H04W 72/1263
See application file for complete search history.

(56) References Cited

U.S. PATENT DOCUMENTS 9,154,275 B2 * 10/2015 Moon ..................... H04L 5/001
11,831,426 B2 * 11/2023 Nunome ............... H04L 1/0038
(Continued)

OTHER PUBLICATIONS

3GPP TS 38.213 V15.2.0 "3rd Generation Partnership Project; Technical Specification Group Radio Access Network; NR; Physical layer procedures for control (Release 15)," Jun. 2018, 99 pages.
(Continued)

*Primary Examiner* — Jael M Ulysse
(74) *Attorney, Agent, or Firm* — Seed IP Law Group LLP

(57) ABSTRACT

Provided is a terminal which can suitably apply precoding to a PDCCH. In the terminal (100), when a first CC is notified of scheduling information for each of a first component carrier (CC) and a second CC, a restriction determination unit (105) determines, on the basis of a subcarrier interval of the CC to be scheduled by means of the scheduling information among the first CC and the second CC, the maximum number of blind decodings when the scheduling information is blind-decoded. An extraction unit (102) performs the blind decoding on the basis of the maximum number of blind decodings and extracts the scheduling information.

10 Claims, 16 Drawing Sheets

(51) Int. Cl.
*H04L 27/26* (2006.01)
*H04W 72/1263* (2023.01)

(56) References Cited

U.S. PATENT DOCUMENTS

| | | | |
|---|---|---|---|
| 2012/0190395 A1* | 7/2012 | Pan | H04L 5/0053 455/509 |
| 2012/0287878 A1* | 11/2012 | Moon | H04L 5/0044 370/329 |
| 2013/0022014 A1* | 1/2013 | Hong | H04L 5/001 370/329 |
| 2013/0155868 A1* | 6/2013 | Seo | H03M 13/3723 370/241 |
| 2013/0176952 A1* | 7/2013 | Shin | H04L 5/001 370/329 |
| 2013/0329691 A1* | 12/2013 | Kim | H04W 72/21 370/329 |
| 2014/0133427 A1* | 5/2014 | Kim | H04L 5/0053 370/329 |
| 2014/0161082 A1* | 6/2014 | Gao | H04L 5/001 370/329 |
| 2016/0080094 A1* | 3/2016 | Kim | H04W 72/541 455/63.1 |
| 2016/0295560 A1* | 10/2016 | Chen | H04L 5/0094 |
| 2018/0062804 A1* | 3/2018 | Liu | H04L 5/0098 |
| 2018/0098307 A1* | 4/2018 | Yang | H04W 72/23 |
| 2018/0331813 A1* | 11/2018 | Patel | H04L 5/0094 |
| 2019/0029009 A1* | 1/2019 | Freda | H04L 5/0092 |
| 2019/0045489 A1* | 2/2019 | He | H04W 72/12 |
| 2019/0053227 A1* | 2/2019 | Huang | H04L 25/03006 |
| 2019/0215781 A1* | 7/2019 | Jeon | H04W 76/32 |
| 2019/0223164 A1* | 7/2019 | He | H04L 25/0204 |
| 2019/0260530 A1* | 8/2019 | Yi | H04L 5/001 |
| 2019/0273637 A1* | 9/2019 | Zhang | H04B 5/72 |
| 2019/0349155 A1* | 11/2019 | Xu | H04L 5/0053 |
| 2020/0374844 A1* | 11/2020 | Takeda | H04L 27/2602 |
| 2021/0204286 A1* | 7/2021 | Yang | H04L 27/26025 |
| 2021/0227514 A1* | 7/2021 | Takeda | H04L 5/001 |

OTHER PUBLICATIONS

3GPP TS 38.214 V15.2.0, "3rd Generation Partnership Project; Technical Specification Group Radio Access Network; NR; Physical layer procedures for data (Release 15)," Jun. 2018. (95 pages).

Huawei, HiSilicon, "Remaining issues on search space," R1-1805881, Agenda Item: 7.1.3.1.2, 3GPP TSG RAN WG1 Meeting #93, Busan, Korea, May 21-25, 2018, 7 pages.

International Search Report, mailed Jun. 18, 2019, for corresponding International Application No. PCT/JP2019/014928, 4 pages.

MCC Support, "Draft Report of 3GPP TSG RAN WG1 #93 v0.2.0; (Busan, South Korea, May 21-25, 2018)," R1-180xxxx, 3GPP TSG RAN WG1 Meeting #94, Gothenburg, Sweden, Aug. 20-24, 2018, 200 pages.

NTT Docomo, "Revision of SI: Study on New Radio Access Technology," RP-161596 (Revision of RP-161214), Agenda Item: 9.2.2, 3GPP TSG RAN Meeting #73, New Orleans, Sep. 19-22, 2016, 7 pages.

* cited by examiner

| $\mu$ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

FIG. 2

| $\mu$ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

FIG. 3

| $\mu$ | SCS [kHz] | Slot length [ms] |
|---|---|---|
| 0 | 15 | 1 |
| 1 | 30 | 0.5 |
| 2 | 60 | 0.25 |
| 3 | 120 | 0.125 |

FIG. 4

| $\mu$ | PDSCH decoding time $N_1$ [symbols] | |
|---|---|---|
| | dmrs-AdditionalPosition = pos0 in DMRS-DownlinkConfig in either of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB |
| 0 | 8 | 13 |
| 1 | 10 | 13 |
| 2 | 17 | 20 |
| 3 | 20 | 24 |

FIG. 5

| $\mu$ | PDSCH decoding time $N_1$ [symbols] | |
|---|---|---|
| | dmrs-AdditionalPosition = pos0 in DMRS-DownlinkConfig in either of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB |
| 0 | 3 | [13] |
| 1 | 4.5 | [13] |
| 2 | 9 for frequency range 1 | [20] |

FIG. 6

|  | Example 1:<br>Scheduling CC: 15kHz<br>Scheduled CC: 30kHz, 2CCs | Example 2:<br>Scheduling CC: 30kHz<br>Scheduled CC: 15kHz, 2CCs |
|---|---|---|
| The number of BDs | 132 BDs/1ms<br>(3CCs * 44BDs/1ms) | 108 BDs/0.5ms<br>(3CCs * 36BDs/0.5ms) |

FIG. 7

|  | Example 1:<br>Scheduling CC: 15kHz<br>Scheduled CC: 30kHz, 5CCs<br>y = 4 | Example 2:<br>Scheduling CC: 30kHz<br>Scheduled CC: 15kHz, 5CCs<br>y = 4 |
|---|---|---|
| The number of BDs | 176 BDs/1ms<br>(Floor{4 * (3/3) * 44BDs/1ms}) | 144 BDs/0.5ms<br>(Floor{4 * (3/3)*36BDs/0.5ms}) |

FIG. 8

|  | Example 1:<br>Scheduling CC: 15kHz<br>Scheduled CC: 30kHz, 2CCs | Example 2:<br>Scheduling CC: 30kHz<br>Scheduled CC: 15kHz, 2CCs |
|---|---|---|
| The number of BDs for 15 kHz CC | 44 BDs/1ms<br>(1CC * 44BDs/1ms) | 88 BDs/1ms<br>(2CCs * 44BDs/1ms) |
| The number of BDs for 30 kHz CC | 72 BDs/0.5ms<br>(2CCs * 36BDs/0.5ms) | 36 BDs/0.5ms<br>(1CC * 36BDs/0.5ms) |

FIG. 13

|  | Example 1:<br>Scheduling CC: 15kHz<br>Scheduled CC: 30kHz, 5CCs<br>y = 4 | Example 2:<br>Scheduling CC: 30kHz<br>Scheduled CC: 15kHz, 5CCs<br>y = 4 |
|---|---|---|
| The number of BDs for 15 kHz CC | 29 BDs/1ms<br>(Floor[4 * (1/6) * 44BDs/1ms]) | 146 BDs/1ms<br>(Floor[4 * (5/6) * 44BDs/1ms]) |
| The number of BDs for 30 kHz CC | 120 BDs/0.5ms<br>(Floor[4 * (5/6) * 36BDs/0.5ms]) | 24 BDs/0.5ms<br>(Floor[4 * (1/6) * 36BDs/0.5ms]) |

FIG. 14

|  | Example 1:<br>Scheduling CC: 15kHz<br>Scheduled CC: 30kHz, 2CCs | Example 2:<br>Scheduling CC: 30kHz<br>Scheduled CC: 15kHz, 2CCs |
|---|---|---|
| The number of BDs for 15 kHz CC | 44 BDs/1ms<br>(1CC * 44BDs/1ms) | 88 BDs/1ms<br>(2CCs * 44BDs/1ms) |
| The number of BDs for 30 kHz CC | 88 BDs/1ms<br>(2CCs * 44BDs/1ms) | 36 BDs/0.5ms<br>(1CC * 36BDs/0.5ms) |

FIG. 15

|  | Example 1:<br>Scheduling CC: 15kHz<br>Scheduled CC: 30kHz, 5CCs<br>y = 4 | Example 2:<br>Scheduling CC: 30kHz<br>Scheduled CC: 15kHz, 5CCs<br>y = 4 |
|---|---|---|
| The number of BDs for 15 kHz CC | 29 BDs/1ms<br>(Floor{4 * (1/6) * 44BDs/1ms}) | 146 BDs/1ms<br>(Floor{4 * (5/6) * 44BDs/1ms}) |
| The number of BDs for 30 kHz CC | 146 BDs/1ms<br>(Floor{4 * (5/6) * 44BDs/1ms}) | 24 BDs/0.5ms<br>(Floor{4 * (1/6) * 36BDs/0.5ms}) |

FIG. 16

|  | Example 1:<br>Scheduling CC: 15kHz<br>Scheduled CC: 30kHz, 2CCs | Example 2:<br>Scheduling CC: 30kHz<br>Scheduled CC: 15kHz, 2CCs |
|---|---|---|
| The number of BDs for 15 kHz CC | 44 BDs/1ms<br>(1CC * 44BDs/1ms) | 88 BDs/1ms<br>(2CCs * 44BDs/1ms) |
| The number of BDs for 30 kHz CC | 88 BDs/1ms<br>(2CCs * 44BDs/1ms) | 44 BDs/1ms<br>(1CCs * 44BDs/1ms) |

FIG. 17

|  | Example 1:<br>Scheduling CC: 15kHz<br>Scheduled CC: 30kHz, 5CCs<br>y = 4 | Example 2:<br>Scheduling CC: 30kHz<br>Scheduled CC: 15kHz, 5CCs<br>y = 4 |
|---|---|---|
| The number of BDs for 15 kHz CC | 29 BDs/1ms<br>(Floor[4 * (1/6) * 44BDs/1ms]) | 146 BDs/1ms<br>(Floor[4 * (5/6) * 44BDs/1ms]) |
| The number of BDs for 30 kHz CC | 146 BDs/1ms<br>(Floor[4 * (5/6) * 44BDs/1ms]) | 29 BDs/1ms<br>(Floor[4 * (1/6) * 44BDs/1ms]) |

FIG. 18

|  | Example 1:<br>Scheduling CC: 15kHz<br>Scheduled CC: 30kHz<br>Scheduled CC: 60kHz | Example 2:<br>Scheduling CC: 30kHz<br>Scheduled CC: 15kHz<br>Scheduled CC: 60kHz |
|---|---|---|
| The number of BDs | 132 BDs/1ms<br>(3CCs * 44BDs/1ms) | 132 BDs/1ms<br>(3CCs * 44BDs/1ms) |

FIG. 19

|  | Example 1:<br>Scheduling CC: 15kHz<br>Scheduled CC: 30kHz, 3CCs<br>Scheduled CC: 60kHz, 2CCs<br>y = 4 | Example 2:<br>Scheduling CC: 30kHz<br>Scheduled CC: 15kHz, 3CCs<br>Scheduled CC: 60kHz, 2CCs<br>y = 4 |
|---|---|---|
| The number of BDs | 176 BDs/1ms<br>(Floor[4 * (6/6) * 44BDs/1ms]) | 176 BDs/1ms<br>(Floor[4 * (6/6) 44BDs/1ms]) |

FIG. 20

|  | Example 1:<br>Scheduling CC: 15kHz<br>Scheduled CC: 30kHz, 2CCs<br>$\alpha = 0.8$ | Example 2:<br>Scheduling CC: 30kHz<br>Scheduled CC: 15kHz, 2CCs<br>$\alpha = 0.8$ |
|---|---|---|
| The number of BDs for 15 kHz CC | 44 BDs/1ms<br>(1CC * 44BDs/1ms) | 88 BDs/1ms<br>(2CCs * 44BDs/1ms) |
| The number of BDs for 30 kHz CC | 57 BDs/0.5ms<br>(Floor[2CCs * 36BDs/0.5ms * 0.8]) | 36 BDs/0.5ms<br>(1CC * 36BDs/0.5ms) |

FIG. 21

|  | Example 1:<br>Scheduling CC: 15kHz<br>Scheduled CC: 30kHz, 5CCs<br>y = 4<br>$\alpha = 0.8$ | Example 2:<br>Scheduling CC: 30kHz<br>Scheduled CC: 15kHz, 5CCs<br>y = 4<br>$\alpha = 0.8$ |
|---|---|---|
| The number of BDs for 15 kHz CC | 29 BDs/1ms<br>(Floor[4 * (1/6) * 44BDs/1ms]) | 146 BDs/1ms<br>(Floor[4 * (5/6) * 44BDs/1ms]) |
| The number of BDs for 30 kHz CC | 96 BDs/0.5ms<br>(Floor[4 * (5/6) * 36BDs/0.5ms * 0.8]) | 24 BDs/0.5ms<br>(Floor[4 * (1/6) * 36BDs/0.5ms]) |

FIG. 22

| | Example 1:<br>Scheduling CC: 15kHz<br>Scheduled CC: 30kHz, 2CCs | Example 2:<br>Scheduling CC: 30kHz<br>Scheduled CC: 15kHz, 2CCs |
|---|---|---|
| The number of BDs for<br>15 kHz CC | 132 BDs/1ms<br>(3CC * 44BDs/1ms) | 88 BDs/1ms<br>(2CCs * 44BDs/1ms) |
| The number of BDs for<br>30 kHz CC | | 36 BDs/0.5ms<br>(1CC * 36BDs/0.5ms) |

FIG. 23

|  | Example 1:<br>Scheduling CC: 15kHz<br>Scheduled CC: 30kHz, 2CCs | Example 2:<br>Scheduling CC: 30kHz<br>Scheduled CC: 15kHz, 2CCs |
|---|---|---|
| The number of BDs for 15 kHz CC | 44 BDs/1ms<br>(1CC * 44BDs/1ms) | 88 BDs/1ms<br>(2CCs * 44BDs/1ms) |
| The number of BDs for 30 kHz CC | 44 BDs/0.5ms<br>(2CCs * 22BDs/0.5ms) | 36 BDs/0.5ms<br>(1CC * 36BDs/0.5ms) |

FIG. 24

|  | Example 1:<br>Scheduling CC: 15kHz<br>Scheduled CC: 30kHz, 2CCs | Example 2:<br>Scheduling CC: 30kHz<br>Scheduled CC: 15kHz, 2CCs |
|---|---|---|
| The number of BDs for 15 kHz CC | 44 BDs/1ms<br>(1CC * 44BDs/1ms) | 44 BDs/0.5ms<br>(2CCs * 22BDs/0.5ms) |
| The number of BDs for 30 kHz CC | 88 BDs/1ms<br>(2CCs * 44BDs/1ms) | 36 BDs/0.5ms<br>(1CC * 36BDs/0.5ms) |

FIG. 25

|  | Example 1:<br>Scheduling CC: 15kHz<br>Scheduled CC: 30kHz, 2CCs | Example 2:<br>Scheduling CC: 30kHz<br>Scheduled CC: 15kHz, 2CCs |
|---|---|---|
| The number of BDs for 15 kHz CC | 44 BDs/1ms<br>(1CC * 44BDs/1ms) | 88 BDs/1ms<br>(2CCs * 44BDs/1ms) |
| The number of BDs for 30 kHz CC | 88 BDs/1ms<br>(2CCs * 44BDs/1ms) | 72 BDs/1ms<br>(1CC * 72BDs/1ms) |

FIG. 26

|  | Example 1:<br>Scheduling CC: 15kHz<br>Scheduled CC: 30kHz, 5CC<br>sy = 4<br>$\beta$ =1 | Example 2:<br>Scheduling CC: 30kHz<br>Scheduled CC: 15kHz, 5CCs<br>y = 4<br>$\beta$ =1 |
|---|---|---|
| The number of BDs for 15 kHz CC | 50 BDs/1ms<br>(Floor{4 * (2/7) * 44BDs/1ms }) | 125 BDs/1ms<br>(Floor{4 * (5/7) * 44BDs/1ms }) |
| The number of BDs for 30 kHz CC | 125 BDs/1ms<br>(Floor{4 * (5/7) * 44BDs/1ms }) | 41 BDs/0.5ms<br>(Floor{4 * (2/7) * 36BDs/0.5ms}) |

FIG. 27

TERMINAL AND COMMUNICATION METHOD FOR BLIND-DECODING SCHEDULING INFORMATION

TECHNICAL FIELD

The present disclosure relates to a terminal and a communication method.

BACKGROUND ART

A communication system called fifth generation mobile communication system (5G) has been studied. In 5G, it has been studied to flexibly provide functions for each use case that needs increased communication traffic, an increased number of terminals connected, high reliability, and low latency. There are three typical use cases, that is, enhanced Mobile Broadband (eMBB), massive Machine Type Communications (mMTC), and Ultra Reliable and Low Latency Communications (URLLC). In 3GPP (3rd Generation Partnership Project) that is an international standardizing body, a more sophisticated communication system has been considered from both sides, that is, enhancement of LTE system, and NR (New Radio access technology) (see, for example, Non-Patent Literature 1).

In 5G, carrier aggregation (CA) is supported. Carrier aggregation provides two types of scheduling methods, that is, "self-scheduling" and "cross-carrier scheduling". In self-scheduling, a downlink control channel (for example, PDCCH: Physical Downlink Control Channel) and a data channel (for example, PDSCH: Physical Downlink Shared Channel) are transmitted on the same CC (Component Carrier). On the other hand, in cross-carrier scheduling, a downlink control channel and a data channel can be transmitted on different CCs.

CITATION LIST

Non-Patent Literature

NPL 1
RP-161596, "Revision of SI: Study on New Radio Access Technology", NTT DOCOMO, September 2016
NPL 2
3GPP, Draft Report of 3GPP TSG RAN WG1 #93 v0.2.0, May 2018
NPL 3
3GPP TS 38.213 V15.2.0, "NR; Physical layer procedure for control (Release 15)," June 2018
NPL 4
3GPP TS 38.214 V15.2.0, "NR; Physical layer procedures for data (Release 15)," June 2018

SUMMARY OF INVENTION

In NR, multiple numerologies, such as different sub-carrier spacings (SCS), are supported. However, cases where different SCSs are applied to a plurality of CCs in carrier aggregation have not been sufficiently studied.

Non-limiting exemplary embodiments of the present disclosure facilitate providing a terminal and a communication method capable of appropriately carrying out communication when different SCSs are applied to a plurality of CCs in carrier aggregation.

A terminal according to one embodiment of the present disclosure includes control circuitry, which, in operation, when scheduling information for each of a first component carrier (CC) and a second CC is indicated on the first CC, determines a maximum number of blind decoding processes in blind-decoding the scheduling information based on, of the first CC and the second CC, a sub-carrier spacing of a CC to be scheduled in accordance with the scheduling information; and reception circuitry, which, in operation, extracts the scheduling information by blind-decoding the scheduling information based on the maximum number of blind decoding processes.

A communication method according to one embodiment of the present disclosure includes, when scheduling information for each of a first component carrier (CC) and a second CC is indicated on the first CC, determining a maximum number of blind decoding processes in blind-decoding the scheduling information based on, of the first CC and the second CC, a sub-carrier spacing of a CC to be scheduled in accordance with the scheduling information; and extracting the scheduling information by blind-decoding the scheduling information based on the maximum number of blind decoding processes.

It should be noted that general or specific embodiments may be implemented as a system, a method, an integrated circuit, a computer program, a storage medium, or any selective combination thereof.

According to one embodiment of the present disclosure, it is possible to appropriately carry out communication when different SCSs are applied to a plurality of CCs in carrier aggregation.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 is a table showing an example of a correspondence relationship between sub-carrier spacing and the maximum number of blind decoding processes.

FIG. 3 is a table showing an example of a correspondence relationship between sub-carrier spacing and the maximum number of CCEs.

FIG. 4 is a table showing an example of a correspondence relationship among sub-carrier spacing, index, and slot length.

FIG. 5 is a table showing a correspondence relationship between sub-carrier spacing and $N_1$.

FIG. 6 is a table showing a correspondence relationship between sub-carrier spacing and $N_1$.

FIG. 7 is a table showing an example of a determining method for the maximum number of blind decoding processes and the maximum number of CCEs based on the SCS of a scheduling CC.

FIG. 8 is a table showing an example of a determining method for the maximum number of blind decoding processes and the maximum number of CCEs based on the SCS of a scheduling CC.

FIG. 13 is a table showing an example of a determining method for the maximum number of blind decoding processes according to determination method 1.

FIG. 14 is a table showing an example of a determining method for the maximum number of blind decoding processes according to determination method 1.

FIG. 15 is a table showing an example of a determining method for the maximum number of blind decoding processes according to determination method 2-1.

FIG. 16 is a table showing an example of a determining method for the maximum number of blind decoding processes according to determination method 2-1.

FIG. 17 is a table showing an example of a determining method for the maximum number of blind decoding processes according to determination method 2-2.

FIG. 18 is a table showing an example of a determining method for the maximum number of blind decoding processes according to determination method 2-2.

FIG. 19 is a table showing an example of a determining method for the maximum number of blind decoding processes according to determination method 2-3.

FIG. 20 is a table showing an example of a determining method for the maximum number of blind decoding processes according to determination method 2-3.

FIG. 21 is a table showing an example of a determining method for the maximum number of blind decoding processes according to determination method 2-4.

FIG. 22 is a table showing an example of a determining method for the maximum number of blind decoding processes according to determination method 2-4.

FIG. 23 is a table showing another example of a determining method for the maximum number of blind decoding processes.

FIG. 24 is a table showing another example of a determining method for the maximum number of blind decoding processes.

FIG. 25 is a table showing another example of a determining method for the maximum number of blind decoding processes.

FIG. 26 is a table showing another example of a determining method for the maximum number of blind decoding processes.

FIG. 27 is a table showing another example of a determining method for the maximum number of blind decoding processes.

DESCRIPTION OF EMBODIMENTS

Hereinafter, embodiments of the present disclosure will be described in detail with reference to the accompanying drawings.

[Maximum Number of Blind Decoding Processes and Maximum Number of CCEs]

In PDCCH, the number of times a terminal (for example, UE: User Equipment) is able to perform a blinding decoding process in one slot (hereinafter, referred to as "maximum number of blind decoding processes") and the number of CCEs (Control Channel Elements) the terminal is able to perform channel estimation (hereinafter, referred to as "maximum number of CCEs") are provided.

As the maximum number of blind decoding processes and the maximum number of CCEs increase, a terminal has increased opportunities to be able to receive many PDCCHs, while a processing time of the terminal increases. For this reason, the maximum number of blind decoding processes and the maximum number of CCEs need to be determined such that requirements of a processing time of a terminal are not violated.

[Cross-Carrier Scheduling with Different SCSs]

In cross-carrier scheduling, the SCS of a CC for scheduling (hereinafter, referred to as "scheduling CC") can be different from the SCS of a CC to be scheduled (hereinafter, referred to as "scheduled CC").

Figure 1:
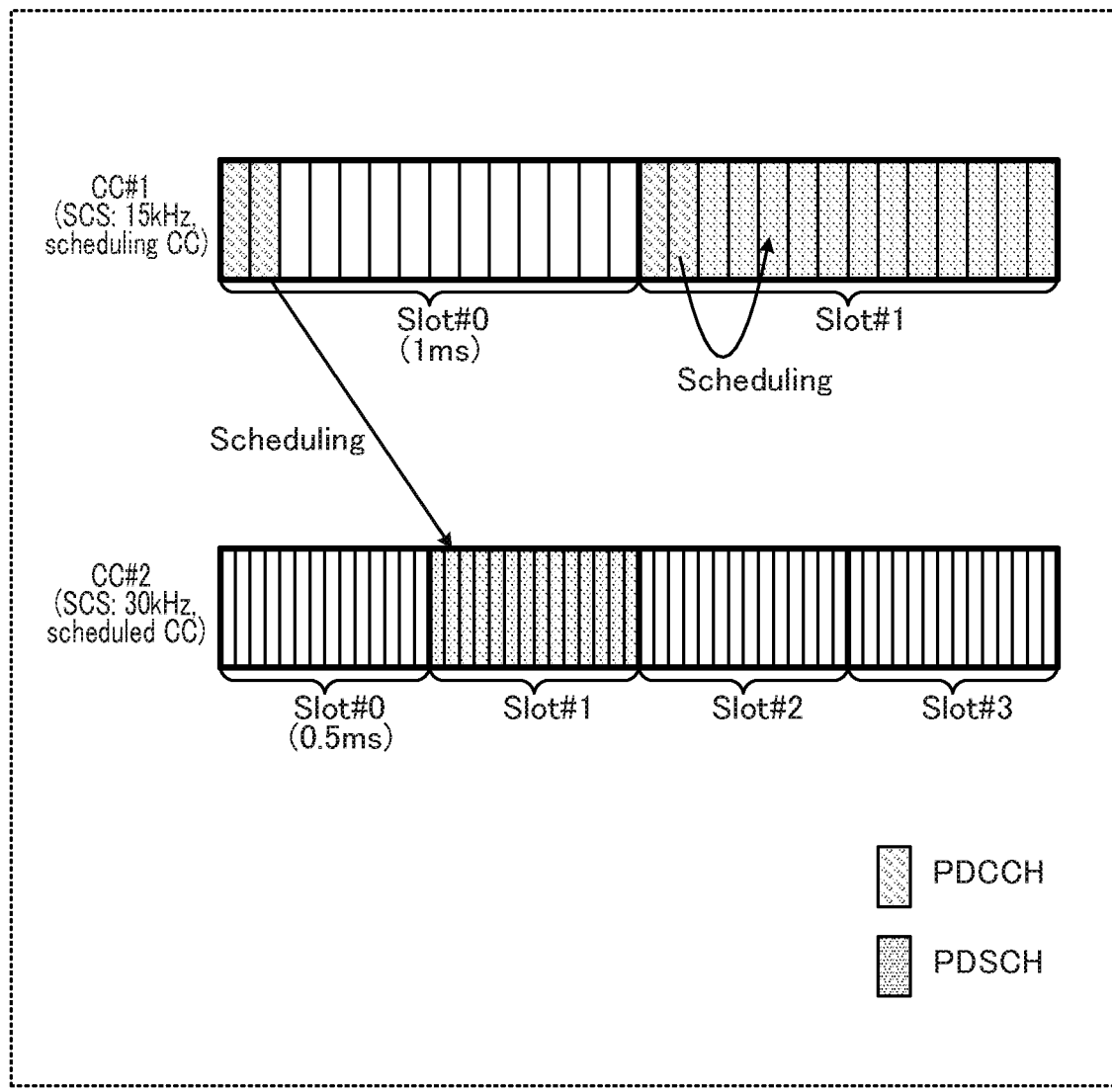
FIG. 1 is a diagram showing an example of cross-carrier scheduling in a case of different SCSs.

FIG. 1 shows an example in which the SCS of a scheduling CC is different from the SCS of a scheduled CC. In FIG. 1, CC#1 is a scheduling CC, and CC#2 is a scheduled CC. As shown in FIG. 1, the SCS of CC#1 is 15 kHz, so the slot length is 1 ms. The SCS of CC#2 is 30 kHz, so the slot length is 0.5 ms. As shown in FIG. 1, a PDCCH for scheduling CC#2 that is a scheduled CC is transmitted on CC#1 that is a scheduling CC. A PDCCH for scheduling CC#1 may be transmitted on CC#1 that is a scheduling CC.

In this way, in cross-carrier scheduling, a PDCCH including scheduling information for a scheduling CC and a PDCCH including a scheduled CC are transmitted on the scheduling CC. On the other hand, in cross-carrier scheduling, no PDCCH is transmitted on a scheduled CC.

Among CCs allocated to a terminal, which CC is a scheduling CC and which CC is a scheduled CC are set for each terminal.

Settings of the maximum number of blind decoding processes and the maximum number of CCEs in the case where the SCS of a scheduling CC is different from the SCS of a scheduled CC in cross-carrier scheduling have not been sufficiently studied.

[Maximum Number of Blind Decoding Processes and Maximum Number of CCEs in Non-Carrier Aggregation]

The maximum number of blind decoding processes (for example, denoted by "$M_{PDCCH}^{max,slot,\mu}$") and the maximum number of CCEs (for example, denoted by "$C_{PDCCH}^{max,slot,\mu}$") per slot in non-carrier aggregation (non-CA) are defined as shown in, for example, FIGS. 2 and 3 (see, for example, NPL 3). In FIGS. 2 and 3, $\mu$ denotes the index of an SCS. FIG. 4 shows an example of a relationship among index $\mu$, SCS, and slot length.

The maximum number of blind decoding processes and the maximum number of CCEs, shown in FIGS. 2 and 3, are numbers per slot. For this reason, as the SCS increases (in other words, as $\mu$ increases), the maximum number of blind decoding processes and the maximum number of CCEs per unit time increase. For example, in FIG. 2, the maximum number of blind decoding processes at SCS=15 kHz ($\mu$=0) is 44 per slot (in other words, 1 ms) (expressed as 44 BDs/1 ms). In contrast, in FIG. 2, the maximum number of blind decoding processes at SCS=30 kHz ($\mu$=1) is 36 per slot (in other words, 0.5 ms) (expressed as 36 BDs/0.5 ms), so the maximum number of blind decoding processes is 72 per 1 ms (expressed as 72 BDs/1 ms). Thus, the maximum number of blind decoding processes per unit time at SCS=30 kHz is greater than that at SCS=15 kHz. This also applies to other SCSs or the maximum number of CCEs.

In a terminal, as the SCS increases, the maximum number of blind decoding processes per unit time increases, and higher processing capabilities are needed in receiving a PDCCH. For example, when PDCCH reception processing is performed by using hardware with high processing capabilities for a high SCS regardless of SCS in a terminal, there is a problem that power consumption increases. On the other hand, when PDCCH reception processing is performed by using hardware with low processing capabilities for a low SCS regardless of SCS in a terminal, the reception processing may not complete within a request processing time for an increased number of blind decoding processes.

Therefore, in a terminal, reception processing should be configured to complete within a request processing time while suppressing an increase in power consumption by performing the reception processing using hardware (or operating clock) for the SCSs of CCs allocated to the terminal.

[Request Processing Time Until Transmission of HARQ-ACK]

In carrier aggregation, a time (denoted by "$T_{proc,1}$") from when a terminal receives the last symbol of a PDSCH (downlink data) to when the terminal transmits a HARQ-ACK (or referred to as ACK/NACK) that is a response signal to the PDSCH is defined as in the following expression 1.

[1]

$$T_{proc,1}=((N_1+d_{1,1}+d_{1,2})(2048+144)\cdot\kappa 2^{-\mu})\cdot T_c \quad \text{(Expression 1)}$$

where $N_1$: the number of symbols obtained by consulting FIG. 5 or FIG. 6 (see, for example, NPL 4)

$d_{1,1}$: coefficient according to a channel through which HARQ-ACK is transmitted (for example, zero in the case where HARQ-ACK is transmitted through a PUCCH, and one in the case where HARQ-ACK is transmitted through a PUSCH)

$d_{1,2}$: coefficient according to a mapping type of a PDSCH and a symbol position at which the PDSCH is transmitted κ: constant (64)

$T_c$: constant ($T_c=1/(\Delta f_{max}\cdot N_f)$) (where $\Delta f_{max}=480\cdot 10^3$ Hz, and $N_f=4096$)

In FIGS. 5 and 6, the SCS number (μ) at which $T_{proc,1}$ is the shortest among the following SCSs is selected as μ:

The SCS of a CC on which a PDCCH is received;

The SCS of a CC on which a PDSCH is received; and

The SCS of a CC on which HARQ-ACK is transmitted.

Referring to FIGS. 5 and 6, $N_1$ [symbols] increases as the SCS becomes lower (as μ reduces) when compared in actual time. For example, in FIG. 5, eight symbols at μ=0 (SCS=15 kHz) (for 15 kHz, (8/14)*1 [ms]=0.57 ms) is longer in time than 10 symbols at μ=1 (SCS=30 kHz) (for 30 kHz, (10/14)*0.5 ms=0.35 ms).

For this reason, a value corresponding to a lowest one of the SCS of a CC on which a PDCCH is received, the SCS of a CC on which a PDSCH is received, and the SCS of a CC on which HARQ-ACK is transmitted in a terminal is selected as $N_1$. Processing capabilities of a terminal may be lower for a low SCS than for a high SCS (for example, a longer request processing time is set). In other words, a request processing time corresponding to an SCS for low processing capabilities among the SCSs of CCs allocated to a terminal is defined in the terminal.

[Request Processing Time Until Transmission of PUSCH]

The same as the above-described "Request Processing Time until Transmission of HARQ-ACK" applies to transmission of a PUSCH (for example, a time from when a terminal receives the last symbol of a PDCCH to when the terminal transmits the first symbol of a PUSCH) (see, for example, NPL 4).

[Blind Decoding Capability Value of Terminal]

A terminal indicates a blind decoding capability to a base station in carrier aggregation by using an integer value of four to 16 (for example, a value corresponding to the number of CCs) (hereinafter, this value is referred to as "blind decoding capability value" or denoted by "y").

For example, when the number of CCs is less than or equal to four, a terminal is desired to, in each CC, support the maximum number of blind decoding processes and the maximum number of CCEs, similar to those in non-carrier aggregation.

On the other hand, when a blind decoding capability value is higher than the number of CCs allocated to a terminal, the terminal is not assumed to, in each CC (for example, in cross-carrier scheduling, a PDCCH addressed to each CC to be scheduled in a scheduling CC), support the maximum number of blind decoding processes and the maximum number of CCEs, greater than those in non-carrier aggregation.

Therefore, it is conceivable that the maximum number of blind decoding processes and the maximum number of CCEs should be defined separately on the following two conditions.

(Condition 1) The number of CCs is less than or equal to four or the number of CCs is less than or equal to a blind decoding capability value.

(Condition 2) The number of CCs is greater than four and the number of CCs is greater than a blind decoding capability value.

Condition 1 is regarded as, for example, a state where a terminal has sufficient capabilities of decoding a PDCCH in each CC allocated to the terminal. Condition 2 is regarded as, for example, a state where a terminal does not have sufficient capabilities of decoding a PDCCH in each CC allocated to the terminal.

[Method of Determining Maximum Number of Blind Decoding Processes and Maximum Number of CCEs from SCS of Scheduling CC]

A method of determining the maximum number of blind decoding processes and the maximum number of CCEs based on the SCS of a scheduling CC in cross-carrier scheduling has been proposed (see, for example, section 7.1.3.1.2 of NPL 2). Specifically, the following method is conceivable.

<Condition (1): The Number of CCs is Less Than or Equal to Four or the Number of CCs is Less Than or Equal to a Blind Decoding Capability Value>

The maximum number of blind decoding processes and the maximum number of CCEs in a scheduling CC are determined by the following expression 2.

$$X*(Mi \text{ or } Ni) \quad \text{(Expression 2)}$$

where

X: the number of CCs to be scheduled

Mi: the maximum number of blind decoding processes in non-CA at SCS i (see, for example, FIG. 2)

Ni: the maximum number of CCEs in non-CA at SCS i (see, for example, FIG. 3)

i: the SCS number (μ) of the SCS of a scheduling CC

A time length for which the maximum number of blind decoding processes (X*Mi) or the maximum number of CCEs (X*Ni), to be determined, is applied is, for example, the slot length of the SCS of the scheduling CC.

FIG. 7 shows an example of calculation of the maximum number of blind decoding processes.

FIG. 7 shows the number of blind decoding processes (for example, the maximum number of blind decoding processes) in each of the case where the SCS of one scheduling CC=15 kHz and the SCS of two scheduled CCs=30 kHz (Example 1) and the case where the SCS of one scheduling CC=30 kHz and the SCS of two scheduled CCs=15 kHz (Example 2).

Specifically, in Example 1, the maximum number of blind decoding processes is X *Mi=3 CCs*44 BDs/1 ms=132 BDs/1 ms. In Example 2, the maximum number of blind decoding processes is X*Mi=3 CCs*36 BDs/0.5 ms=108 BDs/0.5 ms.

<Condition (2): The Number of CCs is Greater Than Four and the Number of CCs is Greater Than a Blind Decoding Capability Value>

The maximum number of blind decoding processes and the maximum number of CCEs in a scheduling CC are determined by the following expression 3.

$$\text{Floor}\{y*(X/T)*(Mi \text{ or } Ni)\} \qquad \text{(Expression 3)}$$

where

Floor{ }: floor function
y: blind decoding capability value
X: the number of CCs to be scheduled
T: the number of all CCs allocated to a terminal
Mi: the maximum number of blind decoding processes in non-CA at SCS i (see, for example, FIG. 2)
Ni: the maximum number of CCEs in non-CA at SCS i (see, for example, FIG. 3)
i: the SCS number of the SCS of a scheduling CC A time length for which the maximum number of blind decoding processes (Floor{y*(X/T)*Mi}) or the maximum number of CCEs (Floor{y*(X/T)*Ni}), to be determined, is applied is, for example, the slot length of the SCS of the scheduling CC.

FIG. 8 shows an example of calculation of the maximum number of blind decoding processes.

FIG. 8 shows the number of blind decoding processes (for example, the maximum number of blind decoding processes) in each of the case where the SCS of one scheduling CC=15 kHz, the SCS of five scheduled CCs=30 kHz, and the blind decoding capability value y=4 (Example 1) and the case where the SCS of one scheduling CC=30 kHz, the SCS of five scheduled CCs=15 kHz, and the blind decoding capability value y=4 (Example 2).

Specifically, in Example 1, the maximum number of blind decoding processes is Floor{y*(X/T)*Mi}=Floor{4*(3/3) *44 BDs/1 ms}=176 BDs/1 ms. In Example 2, the maximum number of blind decoding processes is Floor{y*(X/T) *Mi}=Floor{4*10 (3/3)*36 BDs/0.5 ms=144 BDs/0.5 ms.

The maximum number of blind decoding processes (Mi) is described with reference to FIGS. 7 and 8, and the same applies to the maximum number of CCEs (Ni).

It is found that, in any of Condition (1) and Condition (2), the maximum number of blind decoding processes and the maximum number of CCEs per unit time increase and high processing capabilities are required of a terminal in the case where scheduling is performed from a scheduling CC with a high SCS to a scheduled CC with a low SCS (Example 2) as compared to the case where scheduling is performed from a scheduling CC with a low SCS to a scheduled CC with a high CC (Example 1).

For example, in Example 2 of FIG. 7, the maximum number of blind decoding processes per 1 ms is 216 BDs/1 ms and is greater than the number of blind decoding processes 132 BDs/1 ms of Example 1. Similarly, in Example 2 of FIG. 8, the maximum number of blind decoding processes per 1 ms is 288 BDs/1 ms and is greater than the number of blind decoding processes 176 BDs/1 ms of Example 1.

On the other hand, as described above, "Request Processing Time until Transmission of HARQ-ACK" or "Request Processing Time until Transmission of PUSCH" is set according to a request processing time corresponding to a low SCS. Thus, a request processing time in a terminal is the same in any one of Condition (1) (scheduling from a CC with a low SCS to a CC with a high SCS) and Condition (2) (scheduling from a CC with a high SCS to a CC with a low SCS).

Thus, for example, when scheduling is performed from a CC with a high SCS to a CC with a low SCS as in the case of Example 2 in FIG. 7 or FIG. 8, a request processing time corresponding to an SCS that relatively does not require high processing capabilities is set in a terminal; whereas the maximum number of blind decoding processes and the maximum number of CCEs for which relatively high processing capabilities are required of the terminal are set.

Therefore, depending on implementation of a terminal, a request processing time of the terminal may not be satisfied when scheduling is performed from a CC with a high SCS to a CC with a low SCS. Alternatively, cost or power consumption of a terminal may increase due to higher capabilities of the terminal to satisfy a request processing time.

Therefore, hereinafter, a method of appropriately setting the maximum number of blind decoding processes and the maximum number of CCEs in cross-carrier scheduling with CCs of different SCSs will be described.

[Overview of Communication System]

A communication system according to one embodiment of the present disclosure includes terminal 100 (for example, UE) and base station 200 (for example, gNB).

Figure 9:
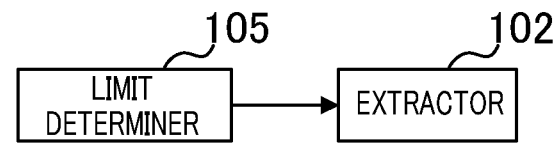
FIG. 9 is a block diagram showing a configuration of a part of a terminal.

FIG. 9 is a block diagram showing a configuration of a part of terminal 100 according to one embodiment of the present disclosure. In terminal 100 shown in FIG. 9, when scheduling information for each of a first component carrier (for example, scheduling CC) and a second CC (for example, scheduled CC) is indicated on the first CC, limit determiner 105 determines the maximum number of blind decoding processes (or the maximum number of CCEs) in blind-decoding the scheduling information based on, of the first CC and the second CC, the sub-carrier spacing (SCS) of a CC to be scheduled in accordance with the scheduling information. Extractor 102 extracts the scheduling information by blind-decoding the scheduling information based on the maximum number of blind decoding processes (or the maximum number of CCEs).

[Configuration of Terminal]

Figure 10:
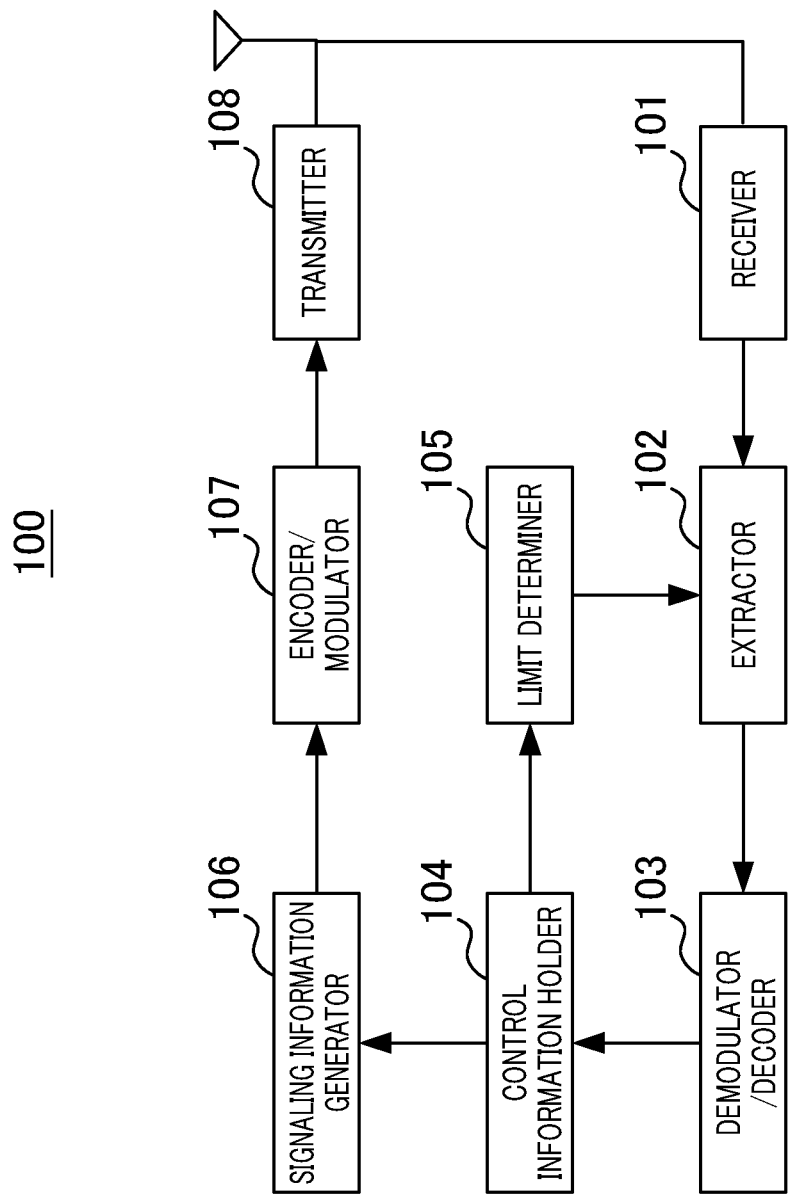
FIG. 10 is a block diagram showing a configuration of the terminal.

FIG. 10 is a block diagram showing a configuration of terminal 100 according to one embodiment of the present disclosure. Terminal 100 shown in FIG. 10 includes receiver 101, extractor 102, demodulator/decoder 103, control information holder 104, limit determiner 105, signaling information generator 106, encoder/modulator 107, and transmitter 108.

Receiver 101 performs reception processing such as down-conversion or A/D conversion on a received signal received via an antenna and outputs the received signal to extractor 102.

Extractor 102 determines radio resources (for example, frequency resources, time resources, or the like) scheduled in terminal 100, based on information indicating the maximum number of blind decoding processes and the maximum number of CCEs, input from limit determiner 105. Extractor 102 performs a blind decoding process based on the determined radio resources and extracts, for example, a PDCCH signal (including, for example, scheduling information)

from the received signal input from receiver 101. Extractor 102 extracts, from the received signal, signaling information coming from base station 200. For example, signaling information may be indicated by information of any one or combination of two or more of DCI (Downlink Control Information), MAC (Medium Access Control), and RRC (Radio Resource Control). Extractor 102 outputs the extracted signal to demodulator/decoder 103.

Demodulator/decoder 103 demodulates and decodes a PDCCH signal or signaling information, input from extractor 102. Demodulator/decoder 103 outputs, for example, information on CCs included in the decoded signaling information to control information holder 104. The information on CCs includes allocated CC information, for example, the number of CCs, the SCS of each CC, information indicating which CC is a scheduling CC and which CC is a scheduled CC in cross-carrier scheduling, and the like.

Control information holder 104 holds, for example, a blind decoding capability value (y) of terminal 100 or allocated CC information input from demodulator/decoder 103. Control information held by control information holder 104 includes quasi-static control information or dynamic control information. Control information holder 104 outputs the held control information to limit determiner 105 and signaling information generator 106 as needed.

Limit determiner 105 determines the number of blind decoding processes and the number of CCEs of a PDCCH transmitted to terminal 100, based on a blind decoding capability value and allocated CC information, input from control information holder 104. Limit determiner 105 outputs information indicating the determined number of blind decoding processes and the determined number of CCEs to extractor 102.

Signaling information generator 106 generates signaling information based on, for example, a blind decoding capability value input from control information holder 104 and outputs the signaling information to encoder/modulator 107.

Encoder/modulator 107 encodes and modulates signaling information input from signaling information generator 106 and outputs the generated transmission signal to transmitter 108.

Transmitter 108 performs transmission processing such as D/A conversion, up-conversion, or amplification on a signal input from encoder/modulator 107 and transmits a radio signal obtained through the transmission processing to base station 200 via the antenna.

[Configuration of Base Station]

Figure 11:
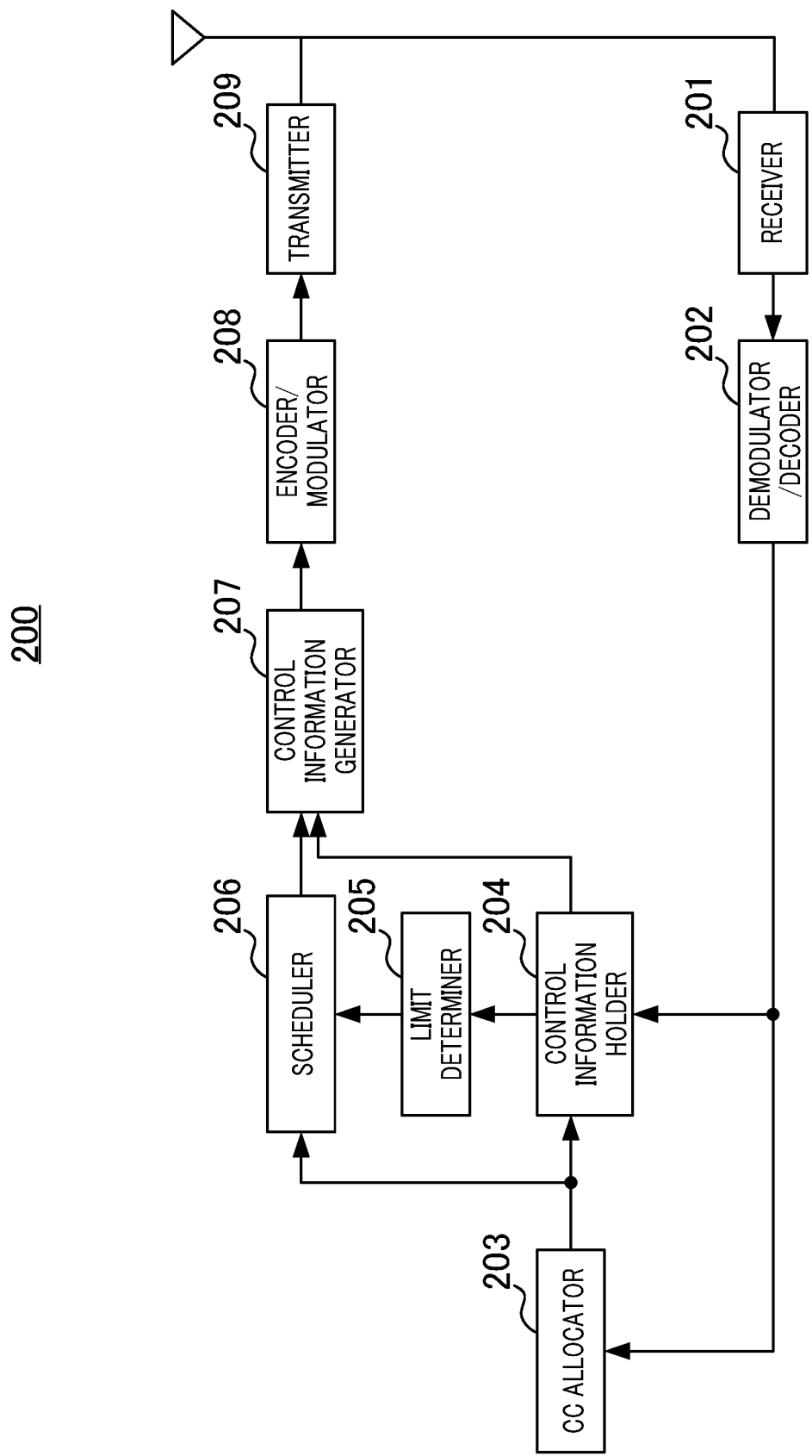
FIG. 11 is a block diagram showing a configuration of a base station.

FIG. 11 is a block diagram showing a configuration of base station 200 according to one embodiment of the present disclosure. In FIG. 11, base station 200 includes receiver 201, demodulator/decoder 202, CC allocator 203, control information holder 204, limit determiner 205, scheduler 206, control information generator 207, encoder/modulator 208, and transmitter 209.

Receiver 201 receives via the antenna a signal transmitted from terminal 100, performs reception processing such as down-conversion or A/D conversion on the received signal, and outputs a received signal after the reception processing to demodulator/decoder 202.

Demodulator/decoder 202 demodulates and decodes a received signal input from receiver 201 and outputs signaling information (including, for example, the blind decoding capability value of terminal 100) included in the decoded control information to CC allocator 203 and control information holder 204.

CC allocator 203 determines CCs to be allocated to terminal 100 (for example, the number of CCs, SCS, or the like) based on information on CCs available to be allocated to terminal 100 by base station 200 and the blind decoding capability value of terminal 100, included in signaling information input from demodulator/decoder 202. CC allocator 203 outputs allocated CC information indicating determined allocated CCs to control information holder 204 and scheduler 206.

Control information holder 204 holds, for example, the blind decoding capability value of terminal 100, input from demodulator/decoder 202, and allocated CC information input from CC allocator 203, and outputs the held control information to limit determiner 205 as needed.

Limit determiner 205 determines the number of blind decoding processes and the number of CCEs of a PDCCH transmitted to terminal 100, based on a blind decoding capability value and allocated CC information, input from control information holder 204. Limit determiner 205 outputs information indicating the determined number of blind decoding processes and the determined number of CCEs to scheduler 206.

Scheduler 206 performs scheduling (for example, determines frequency resources and transmission timing) for transmitting control information (for example, PDCCH) addressed to terminal 100, based on, for example, allocated CC information input from CC allocator 203 and information indicating the number of blind decoding processes and the number of CCEs input from limit determiner 205. Scheduler 206 outputs scheduling information indicating a scheduling result (for example, a resource allocation result or the like) to control information generator 207.

Control information generator 207 generates a PDCCH signal addressed to terminal 100 based on scheduling information input from scheduler 206 and outputs the generated PDCCH signal to encoder/modulator 208. Control information generator 207 generates, for example, signaling information including allocated CC information input from control information holder 204 and outputs the signaling information to encoder/modulator 208.

Encoder/modulator 208 encodes control information input from control information generator 207, modulates the encoded signal, and outputs the modulated signal (symbol sequence) to transmitter 209.

Transmitter 209 performs transmission processing such as D/A conversion, up-conversion, or amplification on a signal input from encoder/modulator 208 and transmits a radio signal obtained through the transmission processing to terminal 100 via the antenna.

[Operations of Terminal 100 and Base Station 200]

The operations of terminal 100 and base station 200 having the above configurations will be described in detail.

Figure 12:
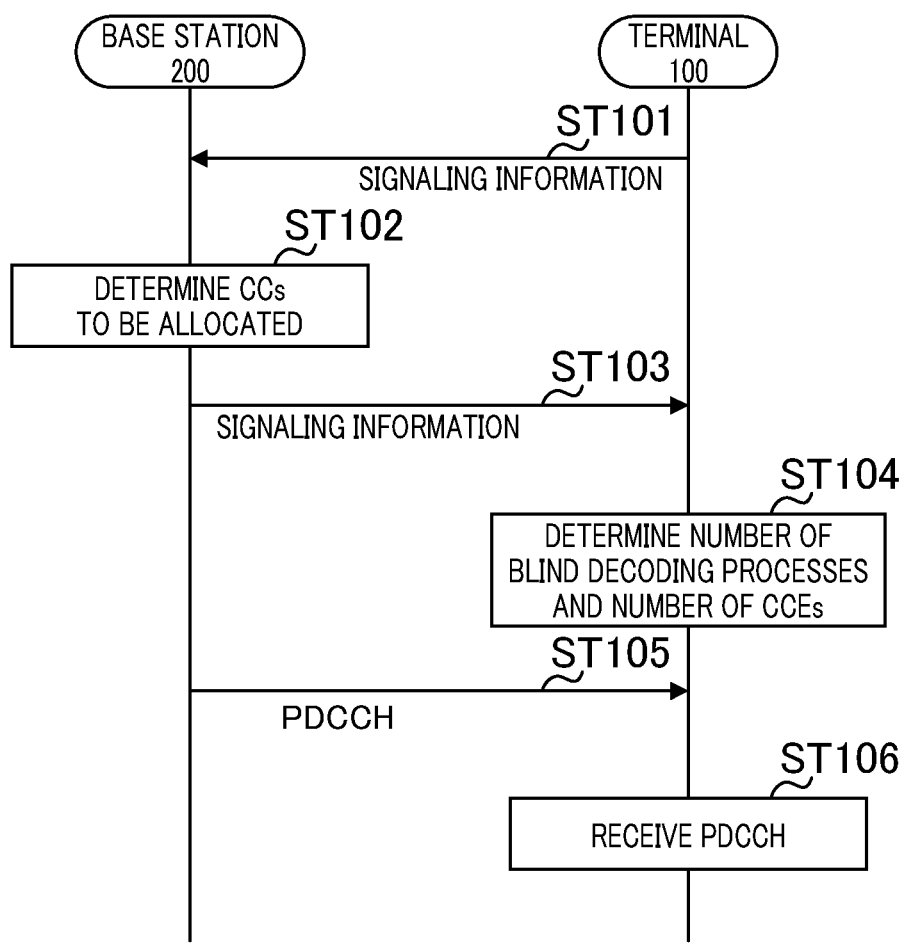
FIG. 12 is a sequence diagram showing an example of operations of the terminal and the base station.

FIG. 12 is a sequence diagram showing the operations of terminal 100 and base station 200.

Terminal 100 transmits, to base station 200, for example, signaling information including the blind decoding capability value (y) of terminal 100 (ST101).

Base station 200 determines CCs to be allocated to terminal (the number of CCs, SCS, and the like) based on, for example, the blind decoding capability value of terminal 100 (ST102). Base station 200 transmits, to terminal 100, signaling information including allocated CC information indicating the determined CCs (ST103).

Terminal 100 determines the number of blind decoding processes and the number of CCEs in receiving a PDCCH based on, for example, the blind decoding capability value of terminal 100 and the allocated CC information indicated from base station 200 (ST104).

Base station 200 determines CCs to be allocated to terminal 100 (the number of CCs, SCS, and the like) based on, for example, the blind decoding capability value of terminal 100, performs scheduling of a PDCCH signal addressed to terminal 100, and transmits the PDCCH signal to terminal 100 (ST105). Terminal 100 receives (for example, blind-decodes) a PDCCH signal transmitted from base station 200, based on the determined number of blind decoding processes and the determined number of CCEs (ST106).

[Determining Method for Number of Blind Decoding Processes and Number of CCEs]

Next, a determining method for the number of blind decoding processes and the number of CCEs of terminal 100 in terminal 100 (limit determiner 105) and base station 200 (limit determiner 205) will be described.

Terminal 100 and base station 200, in cross-carrier scheduling, determines the number of blind decoding processes and the number of CCEs based on, of CCs to be allocated to terminal 100, at least the SCS of a CC to be scheduled such that a request processing time in terminal 100 is satisfied.

The "CCs to be scheduled" include not only a scheduled CC to be scheduled by a PDCCH in a scheduling CC but also a scheduling CC to be scheduled by a PDCCH in the scheduling CC.

[Determining Method 1]

In determining method 1, terminal 100 and base station 200 determine the maximum number of blind decoding processes and the maximum number of CCEs by using the number of blind decoding processes and the number of CCEs, associated with the SCS of a CC to be scheduled in accordance with scheduling information (in other words, PDCCH) indicated on a scheduling CC.

<Condition (1): The Number of CCs is Less Than or Equal to Four or the Number of CCs is Less Than or Equal to a Blind Decoding Capability Value>

The maximum number of blind decoding processes and the maximum number of CCEs at each SCS in a scheduling CC are determined by the following expression 4.

$$X_i * (M_i \text{ or } N_i) \quad \text{(Expression 4)}$$

where $X_i$: the number of CCs to be scheduled at SCS i $M_i$: the maximum number of blind decoding processes in non-CA at SCS i (see, for example, FIG. 2)

$N_i$: the maximum number of CCEs in non-CA at SCS i (see, for example, FIG. 3)

i: the SCS number of the SCS of a CC to be scheduled (scheduled CC or scheduling CC)

A time length for which the maximum number of blind decoding processes ($X_i * M_i$) or the maximum number of CCEs ($X_i * N_i$) at each SCS, to be determined, are applied is, for example, the slot length of the SCS of a CC to be scheduled.

FIG. 13 shows an example of calculation of the maximum number of blind decoding processes based on determining method 1.

FIG. 13 shows the number of blind decoding processes (for example, the maximum number of blind decoding processes) in each of the case where the SCS of one scheduling CC=15 kHz and the SCS of two scheduled CCs=30 kHz (Example 1) and the case where the SCS of one scheduling CC=30 kHz and the SCS of two scheduled CCs=15 kHz (Example 2).

Specifically, in Example 1, the number of blind decoding processes for a CC to be scheduled at SCS=15 kHz (i=0; in FIG. 13, one scheduling CC) is X0*M0=1 CC*44 BDs/1 ms=44 BDs/1 ms. In Example 1, the number of blind decoding processes for CCs to be scheduled at SCS=30 kHz (i=1; in FIG. 13, two scheduled CCs) is X1*M1=2 CCs*36 BDs/0.5 ms=72 BDs/0.5 ms.

In Example 2, the number of blind decoding processes for CCs to be scheduled at SCS=15 kHz (i=0; in FIG. 13, two scheduled CCs) is X0*M0=2 CCs*44 BDs/1 ms=88 BDs/1 ms. In Example 2, the number of blind decoding processes for a CC to be scheduled at SCS=30 kHz (i=1; in FIG. 13, one scheduling CC) is X1*M1=1 CC*36 BDs/0.5 ms=36 BDs/0.5 ms.

<Condition (2): The Number of CCs is Greater Than Four and the Number of CCs is Greater Than a Blind Decoding Capability Value>

The maximum number of blind decoding processes and the maximum number of CCEs at each SCS in a scheduling CC are determined by the following expression 5.

$$\text{Floor}\{y*(X_i/T)*(M_i \text{ or } N_i)\} \quad \text{(Expression 5)}$$

where

Floor{ }: floor function y: blind decoding capability value $X_i$: the number of CCs to be scheduled at SCS i T: the number of all CCs allocated to a terminal $M_i$: the maximum number of blind decoding processes in non-CA at SCS i (see, for example, FIG. 2)

$N_i$: the maximum number of CCEs in non-CA at SCS i (see, for example, FIG. 3)

i: the SCS number of the SCS of a CC to be scheduled

A time length for which the maximum number of blind decoding processes (Floor{y*(Xi/T)*Mi}) or the maximum number of CCEs (Floor{y*(Xi/T)*Ni}) at each SCS, to be determined, are applied is, for example, the slot length of the SCS of a CC to be scheduled.

FIG. 14 shows an example of calculation of the maximum number of blind decoding processes based on determining method 1.

FIG. 14 shows the number of blind decoding processes (for example, the maximum number of blind decoding processes) in each of the case where the SCS of one scheduling CC=15 kHz, the SCS of five scheduled CCs=30 kHz, and the blind decoding capability value y=4 (Example 1) and the case where the SCS of one scheduling CC=30 kHz, the SCS of five scheduled CCs=15 kHz, and the blind decoding capability value y=4 (Example 2).

Specifically, in Example 1, the number of blind decoding processes for a CC to be scheduled at SCS=15 kHz (i=0; in FIG. 14, one scheduling CC) is Floor{y*(X0/T)*M0}=Floor{4*(1/6)*44 BDs/1 ms}=29 BDs/1 ms. In Example 1, the number of blind decoding processes for CCs to be scheduled at SCS=30 kHz (i=1; in FIG. 14, five scheduled CCs) is Floor{y*(X1/T)*M1}=Floor{4*(5/6)*36 BDs/0.5 ms}=120 BDs/0.5 ms.

In Example 2, the number of blind decoding processes for CCs to be scheduled at SCS=15 kHz (i=0; in FIG. 14, five scheduled CCs) is Floor{y*(X0/T)*M0}=Floor{4*(5/6)*44 BDs/1 ms}=146 BDs/1 ms. In Example 2, the number of blind decoding processes for a CC to be scheduled at SCS=30 kHz (i=1; in FIG. 14, one scheduling CC) is Floor{y*(X1/T)*M1}=Floor{4*(1/6)*36 BDs/0.5 ms}=24 BDs/0.5 ms.

The maximum number of blind decoding processes (in other words, Mi) is described with reference to FIGS. 13 and 14, and the same applies to the maximum number of CCEs (in other words, Ni).

In determining method 1, it is possible to apply a different maximum number of blind decoding processes and a different maximum number of CCEs at each of the SCSs of CCs to be scheduled. It is possible to set a processing unit (time length) to apply the maximum number of blind decoding processes and the maximum number of CCEs in accordance with the SCS of a CC to be scheduled.

Thus, with determining method 1, it is possible to determine the maximum number of blind decoding processes and the maximum number of CCEs, which satisfy a request processing time, in terminal 100 that performs reception with processing capabilities in processing unit according to the SCS of a CC to be scheduled.

For example, when scheduling is performed from a CC with a high SCS to a CC with a low SCS as in the case of Example 2 of FIG. 13 or FIG. 14, the maximum number of blind decoding processes and the maximum number of CCEs, associated with a low SCS, are set for a CC with a low SCS, to be scheduled, in determining method 1.

Thus, even when scheduling is performed from a CC with a high SCS to a CC with a low SCS, terminal 100 is able to blind-decode a PDCCH based on the maximum number of blind decoding processes and the maximum number of CCEs according to the low SCS of a CC to be scheduled, so a request processing time of terminal 100 is satisfied. Thus, with determining method 1, it is possible to satisfy a request processing time of terminal 100 without increasing the cost or power consumption of terminal 100.

[Determining Method 2]

In determining method 2, terminal 100 and base station 200 determine the maximum number of blind decoding processes and the maximum number of CCEs by using values (the number of blind decoding processes and the number of CCEs) less than or equal to the number of blind decoding processes and the number of CCEs (for example, the maximum number of blind decoding processes and the maximum number of CCEs, determined by determining method 1), associated with the SCS of a CC to be scheduled in accordance with scheduling information (in other words, PDCCH) indicated on a scheduling CC.

For example, in determining method 1 (see, for example, FIGS. 13 and 14), in the case of scheduling from a CC with a low SCS to a CC with a high SCS (for example, Example 1 in FIGS. 13 and 14), the maximum number of blind decoding processes and the maximum number of CCEs, associated with a CC with a high SCS (SCS=30 kHz in FIGS. 13 and 14), which is a CC to be scheduled, are used.

On the other hand, as described above, "Request Processing Time until Transmission of HARQ-ACK" or "Request Processing Time until Transmission of PUSCH" are defined in accordance with, of SCSs of CCs related to transmission of HARQ-ACK or transmission of a PUSCH, a low SCS (for example, SCS=15 kHz in FIGS. 13 and 14).

Therefore, in the case of scheduling from a CC with a low SCS to a CC with a high SCS, it is recommended to set the maximum number of blind decoding processes and the maximum number of CCEs in accordance with a low SCS (in other words, the SCS of a scheduling CC). In other words, in the case of scheduling from a CC with a low SCS to a CC with a high SCS, it is recommended to further reduce the maximum number of blind decoding processes and the maximum number of CCEs as compared to the case of determining based on a high SCS (in other words, the SCS of a CC to be scheduled) (for example, determining method 1).

Hereinafter, determining methods 2-1, 2-2, 2-3, and 2-4 for the maximum number of blind decoding processes and the maximum number of CCEs will be described.

[Determining Method 2-1]

In determining method 2-1, when the SCS of a CC to be scheduled in accordance with scheduling information (in other words, PDCCH) indicated on a scheduling CC is higher than the SCS of the scheduling CC, terminal 100 and base station 200 determine the maximum number of blind decoding processes and the maximum number of CCEs for the CC to be scheduled, by using the number of blind decoding processes and the number of CCEs, associated with the SCS of the scheduling CC.

On the other hand, when the SCS of a CC to be scheduled by a scheduling CC is not higher than the SCS of the scheduling CC, terminal 100 and base station 200 determine the maximum number of blind decoding processes and the maximum number of CCEs by using, for example, as in the case of determining method 1, the number of blind decoding processes and the number of CCEs, associated with the SCS of a CC to be scheduled.

<Condition (1): The Number of CCs is Less Than or Equal to Four or the Number of CCs is Less Than or Equal to a Blind Decoding Capability Value>

The maximum number of blind decoding processes and the maximum number of CCEs at each SCS in a scheduling CC are determined by the following expression 6.

$$Xi*(Mj \text{ or } Nj) \qquad \text{(Expression 6)}$$

where

Xi: the number of CCs to be scheduled at SCS i

Mj: the maximum number of blind decoding processes in non-CA at SCS j (see, for example, FIG. 2)

Nj: the maximum number of CCEs in non-CA at SCS j (see, for example, FIG. 3)

i: the SCS number of the SCS of a CC to be scheduled j: when the SCS(i) of a CC to be scheduled is higher than the SCS of a scheduling CC, the SCS number of the scheduling CC when the SCS of a CC to be scheduled is not higher than the SCS of the scheduling CC, the SCS number of the CC to be scheduled (j=i)

A time length for which the maximum number of blind decoding processes (Xi*Mj) or the maximum number of CCEs (Xi*Nj) at each SCS, to be determined, are applied is, for example, the slot length of the SCS j.

FIG. 15 shows an example of calculation of the maximum number of blind decoding processes based on determining method 2-1.

FIG. 15 shows the number of blind decoding processes (for example, the maximum number of blind decoding processes) in each of the case where the SCS of one scheduling CC=15 kHz and the SCS of two scheduled CCs=30 kHz (Example 1) and the case where the SCS of one scheduling CC is 30 kHz and the SCS of two scheduled CCs=15 kHz (Example 2).

In FIG. 15, the case where the SCS of a CC to be scheduled is higher than the SCS of a scheduling CC is the case where, in Example 1 (the SCS of a scheduling CC=15 kHz), the scheduled CCs at SCS=30 kHz are set as CCs to be scheduled (a portion surrounded by the dashed line). In this case, in the expression 6, j=0 (the SCS number of the scheduling CC). Thus, as shown in FIG. 15, in Example 1, the number of blind decoding processes for CCs to be scheduled at SCS=30 kHz (i=1, j=0; in FIG. 15, two scheduled CCs) is X1*M0=2 CCs*44 BDs/1 ms=88 BDs/1 ms.

Here, determining method 2-1 (FIG. 15) will be compared with determining method 1 (FIG. 13). When the SCS of a CC to be scheduled is higher than the SCS of a scheduling CC (when a CC to be scheduled in Example 1 is 30 kHz CC), the maximum number of blind decoding processes is 72 BDs/0.5 ms for determining method 1; whereas the maximum number of blind decoding processes is 88 BDs/1 ms, that is, 44 BDs/0.5 ms, for determining method 2-1. In this way, in determining method 2-1, it is possible to reduce the maximum number of blind decoding processes in the case where the SCS of a CC to be scheduled is higher than the SCS of a scheduling CC as compared to determining method 1.

In FIG. 15, cases other than the above apply to the case where the SCS of a CC to be scheduled is not higher than the SCS of a scheduling CC (that is, j=i), so the maximum number of blind decoding processes as in the case of determining method 1 (for example, FIG. 13) is determined.

<Condition (2): The Number of CCs is Greater Than Four and the Number of CCs is Greater Than a Blind Decoding Capability Value>

The maximum number of blind decoding processes and the maximum number of CCEs at each SCS in a scheduling CC are determined by the following expression 7.

$$\text{Floor}\{y*(Xi/T)*(Mj \text{ or } Nj)\} \quad \text{(Expression 7)}$$

where

Floor{ }: floor function
y: blind decoding capability value
Xi: the number of CCs to be scheduled at SCS i
T: the number of all CCs allocated to a terminal
Mj: the maximum number of blind decoding processes in non-CA at SCS j (see, for example, FIG. 2)
Nj: the maximum number of CCEs in non-CA at SCS j (see, for example, FIG. 3)
i: the SCS number of the SCS of a CC to be scheduled
j: when the SCS(i) of a CC to be scheduled is higher than the SCS of a scheduling CC, the SCS number of the scheduling CC when the SCS of a CC to be scheduled is not higher than the SCS of the scheduling CC, the SCS number of the CC to be scheduled (j=i)

A time length for which the maximum number of blind decoding processes (Floor{*(Xi/T)*Mj}) or the maximum number of CCEs (Floor{y*(Xi/T)*Nj}) at each SCS, to be determined, are applied is, for example, the slot length of the SCS j.

FIG. 16 shows an example of calculation of the maximum number of blind decoding processes based on determining method 2-1.

FIG. 16 shows the number of blind decoding processes (for example, the maximum number of blind decoding processes) in each of the case where the SCS of one scheduling CC=15 kHz, the SCS of five scheduled CCs=30 kHz, and the blind decoding capability value y=4 (Example 1) and the case where the SCS of one scheduling CC=30 kHz, the SCS of five scheduled CCs=15 kHz, and the blind decoding capability value y=4 (Example 2).

In FIG. 16, the case where the SCS of a CC to be scheduled is higher than the SCS of a scheduling CC is the case where, in Example 1 (the SCS of a scheduling CC=15 kHz), the scheduled CCs at SCS=30 kHz are set as CCs to be scheduled (a portion surrounded by the dashed line). In this case, in the expression 7, j=0 (the SCS number of the scheduling CC). Thus, as shown in FIG. 16, in Example 1, the number of blind decoding processes for CCs to be scheduled at SCS=30 kHz (i=1, j=0; in FIG. 16, five scheduled CCs) is Floor{y*(X1/T)*M0}=Floor{4*(5/6)*44 BDs/1 ms}=146 BDs/1 ms.

Here, determining method 2-1 (FIG. 16) will be compared with determining method 1 (FIG. 14). When the SCS of a CC to be scheduled is higher than the SCS of a scheduling CC (when a CC to be scheduled in Example 1 is 30 kHz CC), the maximum number of blind decoding processes is 120 BDs/0.5 ms for determining method 1; whereas the maximum number of blind decoding processes is 146 BDs/1 ms, that is, 73 BDs/0.5 ms, for determining method 2-1. In this way, in determining method 2-1, it is possible to reduce the maximum number of blind decoding processes in the case where the SCS of a CC to be scheduled is higher than the SCS of a scheduling CC as compared to determining method 1.

In FIG. 16, cases other than the above apply to the case where the SCS of a CC to be scheduled is not higher than the SCS of a scheduling CC (that is, j=i), so the maximum number of blind decoding processes as in the case of determining method 1 (for example, FIG. 14) is determined.

The maximum number of blind decoding processes (in other words, Mj) is described with reference to FIGS. 15 and 16, and the same applies to the maximum number of CCEs (in other words, Nj).

With determining method 2-1, in the case of scheduling from a scheduling CC with a low SCS to a CC to be scheduled with a high SCS, the maximum number of blind decoding processes and the maximum number of CCEs are determined in accordance with the SCS of a scheduling CC with a low SCS, so it is possible to reduce the maximum number of blind decoding processes and the maximum number of CCEs as compared to determining method 1. Thus, in the case of scheduling from a scheduling CC with a low SCS to a CC to be scheduled with a high SCS, it is possible to prevent setting of the maximum number of blind decoding processes and the maximum number of CCEs, which require high processing capabilities, for a request processing time of terminal 100.

Thus, with determining method 2-1, it is possible to reduce the maximum number of blind decoding processes and the maximum number of CCEs as compared to determining method 1, so a request processing time is more easily satisfied by terminal 100.

Incidentally, in the case of scheduling from a scheduling CC with a high SCS to a CC to be scheduled with a low SCS (in the example of FIGS. 15 and 16, Example 2), the maximum number of blind decoding processes and the maximum number of CCEs are determined based on a high SCS (SCS=30 kHz in FIGS. 15 and 16) for a CC to be scheduled with a high SCS (in other words, scheduling CC).

When it is assumed that terminal 100 has blind decoding capabilities that support a high SCS of a scheduling CC for the scheduling CC, there is no problem even when the maximum number of blind decoding processes and the maximum number of CCEs are determined for the scheduling CC based on the high SCS. In other words, when it is assumed that terminal 100 does not perform demodulation and decoding with low processing capabilities in accordance with a low SCS of a scheduled CC on a scheduling CC with a high SCS, there is no problem even when the maximum number of blind decoding processes and the number of CCEs are determined for the scheduling CC based on the high SCS.

[Determining Method 2-2]

In determining method 2-2, terminal 100 and base station 200 compare the SCS of a scheduling CC with the SCS of a CC to be scheduled in the CC to be scheduled in accordance with scheduling information (in other words, a PDCCH) indicated on the scheduling CC, and determine the maximum number of blind decoding processes and the maximum number of CCEs by using the number of blind decoding processes and the number of CCEs, associated with a lower SCS.

<Condition (1): The Number of CCs is Less Than or Equal to Four or the Number of CCs is Less Than or Equal to a Blind Decoding Capability Value>

The maximum number of blind decoding processes and the maximum number of CCEs at each SCS in a scheduling CC are determined by the following expression 8.

$$Xi*(Mj \text{ or } Nj) \qquad \text{(Expression 8)}$$

where

Xi: the number of CCs to be scheduled at SCS i

Mj: the maximum number of blind decoding processes in non-CA at SCS j (see, for example, FIG. 2)

Nj: the maximum number of CCEs in non-CA at SCS j (see, for example, FIG. 3)

i: the SCS number of the SCS of a CC to be scheduled j: the SCS number of a lower one of the SCS of a scheduling CC and the SCS of a CC to be scheduled A time length for which the maximum number of blind decoding processes (Xi*Mj) or the maximum number of CCEs (Xi*Nj) at each SCS, to be determined, are applied is, for example, the slot length of the SCS j.

FIG. 17 shows an example of calculation of the maximum number of blind decoding processes based on determining method 2-2.

FIG. 17 shows the number of blind decoding processes (for example, the maximum number of blind decoding processes) in each of the case where the SCS of one scheduling CC=15 kHz and the SCS of two scheduled CCs=30 kHz (Example 1) and the case where the SCS of one scheduling CC is 30 kHz and the SCS of two scheduled CCs=15 kHz (Example 2).

Thus, in each of Example 1 and Example 2, the SCS number j of a lower one of the SCS of a scheduling CC and the SCS of a CC to be scheduled is j=0 (which corresponds to SCS=15 kHz).

Specifically, in Example 1, the number of blind decoding processes for a CC to be scheduled at SCS=15 kHz (i=0, j=0; in FIG. 17, one scheduling CC) is X0*M0=1 CC*44 BDs/1 ms=44 BDs/1 ms. In Example 1, the number of blind decoding processes for CCs to be scheduled at SCS=30 kHz (i=1, j=0; in FIG. 17, two scheduled CCs) is X1*M0=2 CCs*44 BDs/1 ms=88 BDs/1 ms.

In Example 2, the number of blind decoding processes for CCs to be scheduled at SCS=15 kHz (i=0, j=0; in FIG. 17, two scheduled CCs) is X0*M0=2 CCs*44 BDs/1 ms=88 BDs/1 ms. In Example 2, the number of blind decoding processes for a CC to be scheduled at SCS=30 kHz (i=1, j=0; in FIG. 17, one scheduling CC) is X1*M0=1 CC*44 BDs/1 ms=44 BDs/1 ms.

Here, when determining method 2-2 (FIG. 17) is compared with determining method 2-1 (FIG. 15), the number of blind decoding processes for a CC to be scheduled at SCS=30 kHz in Example 2 (in other words, when a CC to be scheduled is a scheduling CC) is 36 BDs/0.5 ms in determining method 2-1; whereas the number of blind decoding processes is 44 BDs/1 ms, that is, 22 BDs/0.5 ms, in determining method 2-2.

In this way, in determining method 2-2, it is possible to reduce the maximum number of blind decoding processes as compared to determining method 2-1. In other words, in determining method 2-2, it is possible to reduce the number of blind decoding processes in the case where the SCS of a CC to be scheduled is high (for example, 30 kHz in FIGS. 13 and 17) as compared to determining method 1 (for example, FIG. 13).

<Condition (2): The number of CCs is Greater Than Four and the Number of CCs is Greater Than a Blind Decoding Capability Value>

The maximum number of blind decoding processes and the maximum number of CCEs at each SCS in a scheduling CC are determined by the following expression 9.

$$\text{Floor}\{y*(Xi/T)*(Mj \text{ or } Nj)\} \qquad \text{(Expression 9)}$$

where

Floor{ }: floor function y: blind decoding capability value

Xi: the number of CCs to be scheduled at SCS i

T: the number of all CCs allocated to a terminal

Mj: the maximum number of blind decoding processes in non-CA at SCS j (see, for example, FIG. 2)

Nj: the maximum number of CCEs in non-CA at SCS j (see, for example, FIG. 3)

i: the SCS number of the SCS of a CC to be scheduled j: the SCS number of a lower one of the SCS of a scheduling CC and the SCS of a CC to be scheduled A time length for which the maximum number of blind decoding processes (Floor{y*(Xi/T)*Mj}) or the maximum number of CCEs (Floor{y*(Xi/T)*Nj}) at each SCS, to be determined, are applied is, for example, the slot length of the SCS j.

FIG. 18 shows an example of calculation of the maximum number of blind decoding processes based on determining method 2-2.

FIG. 18 shows the number of blind decoding processes (for example, the maximum number of blind decoding processes) in each of the case where the SCS of one scheduling CC=15 kHz, the SCS of five scheduled CCs=30 kHz, and the blind decoding capability value y=4 (Example 1) and the case where the SCS of one scheduling CC=30 kHz, the SCS of five scheduled CCs=15 kHz, and the blind decoding capability value y=4 (Example 2).

Thus, in each of Example 1 and Example 2, the SCS number j of a lower one of the SCS of a scheduling CC and the SCS of a CC to be scheduled is j=0 (which corresponds to SCS=15 kHz).

Specifically, in Example 1, the number of blind decoding processes for a CC to be scheduled at SCS=15 kHz (i=0, j=0; in FIG. 18, one scheduling CC) is Floor{y*(X0/T)*M0}=Floor{4*(1/6)*44 BDs/1 ms}=29 BDs/1 ms. In Example 1, the number of blind decoding processes for CCs to be scheduled at SCS=30 kHz (i=1, j=0; in FIG. 18, five scheduled CCs) is Floor{y*(X1/T)*M0}=Floor{4*(5/6)*44 BDs/1 ms}=146 BDs/1 ms.

In Example 2, the number of blind decoding processes for CCs to be scheduled at SCS=15 kHz (i=0, j=0; in FIG. 18, five scheduled CCs) is Floor{y*(X0/T)*M0}=Floor{4*(5/6)*44 BDs/1 ms}=146 BDs/1 ms. In Example 2, the number of blind decoding processes for a CC to be scheduled at SCS=30 kHz (i=1, j=0; in FIG. 18, one scheduling CC) is Floor{y*(X1/T)*M0}=Floor{4*(1/6)*44 BDs/1 ms}=29 BDs/1 ms.

Here, when determining method 2-2 (FIG. 18) is compared with determining method 2-1 (FIG. 16), the number of blind decoding processes for a CC to be scheduled at SCS=30 kHz in Example 2 (in other words, when a CC to be scheduled is a scheduling CC) is 24 BDs/0.5 ms, that is, 48 BDs/1 ms, in determining method 2-1; whereas the number of blind decoding processes is 29 BDs/1 ms in determining method 2-2.

In this way, in determining method 2-2, it is possible to reduce the maximum number of blind decoding processes as compared to determining method 2-1. In other words, in determining method 2-2, it is possible to reduce the number of blind decoding processes in the case where the SCS of a CC to be scheduled is high (for example, 30 kHz in FIGS. 14 and 18) as compared to determining method 1 (for example, FIG. 14).

The maximum number of blind decoding processes (in other words, Mj) is described with reference to FIGS. 17 and 18, and the same applies to the maximum number of CCEs (in other words, Nj).

Thus, with determining method 2-2, it is possible to reduce the maximum number of blind decoding processes and the maximum number of CCEs as compared to determining method 2-1, so a request processing time is more easily satisfied by terminal 100.

[Determining Method 2-3]

In determining method 2-3, terminal 100 and base station 200 determine the maximum number of blind decoding processes and the maximum number of CCEs by using the number of blind decoding processes and the number of CCEs, associated with the lowest one of the SCSs of CCs to be scheduled in accordance with scheduling information (in other words, PDCCH) indicated on a scheduling CC.

<Condition (1): The Number of CCs is Less Than or Equal to Four or the Number of CCs is Less Than or Equal to a Blind Decoding Capability Value>

The maximum number of blind decoding processes and the maximum number of CCEs in a scheduling CC are determined by the following expression 10.

$$X*(Mi \text{ or } Ni) \qquad \text{(Expression 10)}$$

where
X: the number of CCs to be scheduled
Mi: the maximum number of blind decoding processes in non-CA at SCS i (see, for example, FIG. 2)
Ni: the maximum number of CCEs in non-CA at SCS i (see, for example, FIG. 3)
i: the SCS number of the lowest one of the SCSs of CCs to be scheduled in a scheduling CC A time length for which the maximum number of blind decoding processes (X*Mi) or the maximum number of CCEs (X*Ni), to be determined, are applied is, for example, the slot length of the SCS i.

FIG. 19 shows an example of calculation of the maximum number of blind decoding processes based on determining method 2-3.

FIG. 19 shows the number of blind decoding processes (for example, the maximum number of blind decoding processes) in each of the case where the SCS of one scheduling CC=15 kHz and the SCSs of two scheduled CCs=30 kHz and 60 kHz (Example 1) and the case where the SCS of one scheduling CC is 30 kHz and the SCSs of two scheduled CCs=15 kHz and 60 kHz (Example 2).

Thus, in each of Example 1 and Example 2, the SCS number i of the lowest one of the SCSs of CCs to be scheduled (including a scheduling CC) is i=0 (which corresponds to SCS=15 kHz).

Specifically, in Example 1 and Example 2, the number of blind decoding processes is X*M0=3 CCs*44 BDs/1 ms=132 BDs/1 ms.

<Condition (2): The Number of CCs is Greater Than Four and the Number of CCs is Greater Than a Blind Decoding Capability Value>

The maximum number of blind decoding processes and the maximum number of CCEs in a scheduling CC are determined by the following expression 11.

$$\text{Floor}\{y*(X/T)*(Mi \text{ or } Ni)\} \qquad \text{(Expression 11)}$$

where
Floor{ }: floor function
y: blind decoding capability value
X: the number of CCs to be scheduled
T: the number of all CCs allocated to a terminal
Mi: the maximum number of blind decoding processes in non-CA at SCS i (see, for example, FIG. 2)
Ni: the maximum number of CCEs in non-CA at SCS i (see, for example, FIG. 3)
i: the SCS number of the lowest one of the SCSs of CCs to be scheduled in a scheduling CC A time length for which the maximum number of blind decoding processes (Floor{y*(X/T)*Mi}) or the maximum number of CCEs (Floor{y*(X/T)*Ni}), to be determined, are applied is, for example, the slot length of the SCS i.

FIG. 20 shows an example of calculation of the maximum number of blind decoding processes based on determining method 2-3.

FIG. 20 shows the number of blind decoding processes (for example, the maximum number of blind decoding processes) in each of the case where the SCS of one scheduling CC=15 kHz, the SCS of three scheduled CCs=30 kHz, the SCS of two scheduled CCs=60 kHz, and the blind decoding capability value y=4 (Example 1) and the case where the SCS of one scheduling CC=30 kHz, the SCS of three scheduled CCs=15 kHz, the SCS of two scheduled CCs=60 kHz, and the blind decoding capability value y=4 (Example 2).

Thus, in each of Example 1 and Example 2, the SCS number i of the lowest one of the SCSs of CCs to be scheduled (including a scheduling CC) is i=0 (which corresponds to SCS=15 kHz).

Specifically, in Example 1 and Example 2, the number of blind decoding processes is Floor{y*(X/T)*M0}=Floor{4*(6/6)*44 BDs/1 ms}=176 BDs/1 ms.

In determining method 2-3, the number of blind decoding processes and the number of CCEs are determined based on the lowest one of the SCSs of CCs to be scheduled, which a scheduling CC is able to schedule. For example, in Example 2 of FIGS. 19 and 20, the number of blind decoding processes is determined for all the CCs to be scheduled based on the lowest SCS (for example, SCS=15 kHz).

For example, determining method 2-3 will be compared with determining method 2-3 (the method based on the lower one of the SCS of a scheduling CC and the SCS of a CC to be scheduled). If CCs (SCS=15 kHz, 30 kHz, and 60 kHz) similar to those of Example 2 in FIG. 19 or FIG. 20 are allocated to terminal 100, the number of blind decoding processes is determined based on, of the SCS of a scheduling CC=30 kHz and the SCS of CCs to be scheduled=60 kHz, SCS=30 kHz in determining method 2-2; whereas the number of blind decoding processes is determined based on SCS=15 kHz in determining method 2-3. Thus, in determining method 2-3, it is possible to further reduce the number of blind decoding processes as compared to determining method 2-2.

In this way, with determining method 2-3, it is possible to reduce the maximum number of blind decoding processes and the maximum number of CCEs as compared to determining method 2-2, so a request processing time is more easily satisfied by terminal 100.

[Determining Method 2-4]

In determining method 2-4, terminal 100 and base station 200 determine the maximum number of blind decoding processes and the maximum number of CCEs by using the number of blind decoding processes and the number of CCEs, associated with the SCS of a CC to be scheduled in accordance with scheduling information (in other words, PDCCH) indicated on a scheduling CC.

In determining method 2-4, when the SCS of a CC to be scheduled is higher than the SCS of a scheduling CC, a coefficient (for example, a value less than one) is multiplied by the maximum number of blind decoding processes and the maximum number of CCEs, determined based on the SCS of the CC to be scheduled.

The coefficient may be varied among SCSs or may be the same for each SCS. The coefficient may be indicated as signaling information from base station 200 to terminal 100 or may be a constant shared in advance between base station 200 and terminal 100.

<Condition (1): The Number of CCs is Less Than or Equal to Four or the Number of CCs is Less Than or Equal to a Blind Decoding Capability Value>

The maximum number of blind decoding processes and the maximum number of CCEs at each SCS in a scheduling CC are determined by the following expressions 12 and 13.

When the SCS of a CC to be scheduled is higher than the SCS of a scheduling CC:

$$\text{Floor}\{X_i*(M_i \text{ or } N_i)*\alpha\} \quad \text{(Expression 12)}$$

When the SCS of a CC to be scheduled is not higher than the SCS of the scheduling CC:

$$X_i*(M_i \text{ or } N_i) \quad \text{(Expression 13)}$$

where

Floor{ }: floor function $X_i$: the number of CCs to be scheduled at SCS i $M_i$: the maximum number of blind decoding processes in non-CA at SCS i (see, for example, FIG. 2)

$N_i$: the maximum number of CCEs in non-CA at SCS i (see, for example, FIG. 3)

i: the SCS number of the SCS of a CC to be scheduled $\alpha$: coefficient

A time length for which the maximum number of blind decoding processes (Floor$\{X_i*M_i*\alpha\}$ or $X_i*M_i$) or the maximum number of CCEs (Floor$\{X_i*N_i*\alpha\}$ or $X_i*N_i$) at each SCS, to be determined, are applied is, for example, the slot length of the SCS of a CC to be scheduled.

FIG. 21 shows an example of calculation of the maximum number of blind decoding processes based on determining method 2-4.

FIG. 21 shows the number of blind decoding processes (for example, the maximum number of blind decoding processes) in each of the case where the SCS of one scheduling CC=15 kHz, the SCS of two scheduled CCs=30 kHz, and the coefficient $\alpha$=0.8 (Example 1) and the case where the SCS of one scheduling CC is 30 kHz, the SCS of two scheduled CCs=15 kHz, and the coefficient $\alpha$=0.8 (Example 2).

In FIG. 21, the case where the SCS of a CC to be scheduled is higher than the SCS of a scheduling CC is the case where, in Example 1 (the SCS of a scheduling CC=15 kHz), the scheduled CCs at SCS=30 kHz are set as CCs to be scheduled (a portion surrounded by the dashed line). In this case, the expression 12 is applied. Thus, as shown in FIG. 21, in Example 1, the number of blind decoding processes for CCs to be scheduled at SCS=30 kHz (i=1; in FIG. 21, two scheduled CCs) is Floor$\{X_1*M_1*\alpha\}$=Floor$\{2$ CCs*36 BDs/0.5 ms*0.8$\}$=57 BDs/0.5 ms.

Here, determining method 2-4 (FIG. 21) will be compared with determining method 1 (FIG. 13). When the SCS of a CC to be scheduled is higher than the SCS of a scheduling CC (when a CC to be scheduled in Example 1 is 30 kHz CC), the maximum number of blind decoding processes is 72 BDs/0.5 ms for determining method 1; whereas the maximum number of blind decoding processes is 57 BDs/0.5 ms for determining method 2-4. In this way, in determining method 2-4, as in the case of determining method 2-1, it is possible to reduce the maximum number of blind decoding processes in the case where the SCS of a CC to be scheduled is higher than the SCS of a scheduling CC as compared to determining method 1.

In FIG. 21, cases other than the above apply to the case where the SCS of a CC to be scheduled is not higher than the SCS of a scheduling CC, and the expression 13 is applied, so the maximum number of blind decoding processes as in the case of determining method 1 (for example, FIG. 13) is determined.

<Condition (2): The Number of CCs is Greater Than Four and the Number of CCs is Greater Than a Blind Decoding Capability Value>

The maximum number of blind decoding processes and the maximum number of CCEs at each SCS in a scheduling CC are determined by the following expressions 14 and 15.

When the SCS of a CC to be scheduled is higher than the SCS of a scheduling CC:

$$\text{Floor}\{y*(X_i/T)*(M_i \text{ or } N_i)*\alpha\} \quad \text{(Expression 14)}$$

When the SCS of a CC to be scheduled is not higher than the SCS of the scheduling CC:

$$\text{Floor}\{y*(X_i/T)*(M_i \text{ or } N_i)\} \quad \text{(Expression 15)}$$

where

Floor{ }: floor function y: blind decoding capability value $X_i$: the number of CCs to be scheduled at SCS i T: the number of all CCs allocated to a terminal $M_i$: the maximum number of blind decoding processes in non-CA at SCS i (see, for example, FIG. 2)

$N_i$: the maximum number of CCEs in non-CA at SCS i (see, for example, FIG. 3)

i: the SCS number of a CC to be scheduled $\alpha$: coefficient

A time length for which the maximum number of blind decoding processes (Floor$\{y*(X_i/T)*M_i*\alpha\}$ or Floor$\{y*(X_i/T)*M_i\}$) and the maximum number of CCEs (Floor$\{y*(X_i/T)*N_i*\alpha\}$ or Floor$\{y*(X_i/T)*N_i\}$) at each SCS, to be determined, are applied is, for example, the slot length of the SCS of a CC to be scheduled.

FIG. 22 shows an example of calculation of the maximum number of blind decoding processes based on determining method 2-4.

FIG. 22 shows the number of blind decoding processes (for example, the maximum number of blind decoding processes) in each of the case where the SCS of one scheduling CC=15 kHz, the SCS of five scheduled CCs=30 kHz, the blind decoding capability value y=4, and the coefficient $\alpha$=0.8 (Example 1) and the case where the SCS of one scheduling CC=30 kHz, the SCS of five scheduled CCs=15 kHz, the blind decoding capability value y=4, and the coefficient $\alpha$=0.8 (Example 2).

In FIG. 22, the case where the SCS of a CC to be scheduled is higher than the SCS of a scheduling CC is the case where, in Example 1 (the SCS of a scheduling CC=15 kHz), the scheduled CCs at SCS=30 kHz are set as CCs to be scheduled (a portion surrounded by the dashed line). In this case, the expression 14 is applied. Thus, as shown in FIG. 22, in Example 1, the number of blind decoding processes for CCs to be scheduled at SCS=30 kHz (i=1; in FIG. 22, five scheduled CCs) is Floor$\{y*(X1/T)*M1*\alpha\}$=Floor$\{4*(5/6)*36$ BDs/0.5 ms*0.8$\}$=96 BDs/0.5 ms.

Here, determining method 2-4 (FIG. 22) will be compared with determining method 1 (FIG. 14). When the SCS of a CC to be scheduled is higher than the SCS of a scheduling CC (when a CC to be scheduled in Example 1 is 30 kHz CC), the maximum number of blind decoding processes is 120 BDs/0.5 ms for determining method 1; whereas the maximum number of blind decoding processes is 96 BDs/0.5 ms for determining method 2-4. In this way, in determining method 2-4, as in the case of determining method 2-1, it is possible to reduce the maximum number of blind decoding processes in the case where the SCS of a CC to be scheduled is higher than the SCS of a scheduling CC as compared to determining method 1.

In FIG. 22, cases other than the above apply to the case where the SCS of a scheduling CC is not lower than the SCS of a CC to be scheduled, and the expression 15 is applied, so the maximum number of blind decoding processes as in the case of determining method 1 (for example, FIG. 14) is determined.

The maximum number of blind decoding processes (in other words, Mi) is described with reference to FIGS. 21 and 22, and the same applies to the maximum number of CCEs (in other words, Ni).

Thus, with determining method 2-4, as in the case of determining method 2-1, it is possible to reduce the maximum number of blind decoding processes and the maximum number of CCEs as compared to determining method 1, so a request processing time is more easily satisfied by terminal 100.

The determining methods for the number of blind decoding processes and the number of CCEs of terminal 100 are described above.

In this way, in the present embodiment, even when a plurality of CCs with different SCSs is allocated to terminal 100 in carrier aggregation, terminal 100 and base station 200 are capable of determining the maximum number of blind decoding processes and the maximum number of CCEs in receiving a PDCCH such that a request processing time of terminal 100 is satisfied. Thus, according to the present embodiment, it is possible to appropriately perform communication in cases where different SCSs are applied to a plurality of CCs. According to the present embodiment, it is possible to avoid an increase in cost or power consumption of a terminal due to higher capabilities of terminal 100 to satisfy a request processing time of terminal 100.

One embodiment of the present disclosure has been described above.

Other Embodiments (1) Base station 200 may select any one of determining method 1 and determining method 2 (determining method 2-1, 2-2, 2-3, or 2-4) for the number of blind decoding processes and the number of CCEs, to be applied, and indicate the determining method to terminal 100 as signaling information. In this case, terminal 100 may perform signaling on how terminal 100 is implemented suitably for which determining method to base station 200, and base station 200 may select a determining method for terminal 100 based on the received signaling.

(2) The maximum number of blind decoding processes or the maximum number of CCEs, determined based on the same SCS, may be (collectively) the single maximum number of blind decoding processes or the single maximum number of CCEs in total even in the case where the SCSs of CCs to be scheduled are different. For example, in determining method 2-1 (see FIG. 15 or FIG. 16), in Example 1, the maximum number of blind decoding processes (or the maximum number of CCEs) determined based on the SCS (SCS=15 kHz) of a scheduling CC is separately set for the case where the SCS of a CC to be scheduled has 15 kHz and the case where the SCS of the CC has 30 kHz. In contrast, as shown in FIG. 23, the maximum number of blind decoding processes (or the maximum number of CCEs) for 15 kHz CC and 30 kHz CC, determined based on the same SCS (SCS=15 kHz) in Example 1 may be handled in total. For example, in Example 1 shown in FIG. 23, 44 BDs/1 ms for 15 kHz CC and 88 BDs/1 ms for 30 kHz CC are added up into 132 BDs/1 ms.

As shown in FIG. 23, it is possible to improve the flexibility of scheduling of a PDCCH among SCSs by consolidating the maximum number of blind decoding processes and the maximum number of CCEs for each of CCs to be scheduled with different SCSs.

In FIG. 23, determining method 2-1 (FIG. 15) is used as an example, and another determining method is also applicable. In FIG. 23, two CCs to be scheduled are described; however, the configuration is not limited thereto. The maximum number of blind decoding processes and the maximum number of CCEs for, of three or more CCs to be scheduled, at least two CCs to be scheduled may be added up.

(3) In each of the above-described determining methods for the maximum number of blind decoding processes and the maximum number of CCEs, the maximum number of blind decoding processes and the maximum number of CCEs, calculated by the determining method under Condition (1) "the number of CCs is less than or equal to four or the number of CCs is less than or equal to a blind decoding capability value", may be used for Condition (2) "the number of CCs is greater than four and the number of CCs is greater than a blind decoding capability value".

For example, in self-scheduling, even in Condition (2) "the number of CCs is greater than four and the number of CCs is greater than a blind decoding capability value", the maximum number of blind decoding processes and the maximum number of CCEs in non-carrier aggregation (for example, in the case of 15 kHz, the maximum number of blind decoding processes: 44, and the maximum number of CCEs: 56) can be applied in SCell (Secondary Cell) (however, a base station makes adjustment such that the maximum values are not exceeded).

Similar to this case, even when a case applies to Condition (2), the maximum number of blind decoding processes and the maximum number of CCEs, calculated by the determining method of Condition (1) "the number of CCs is less than or equal to four and the number of CCs is less than or equal to a blind decoding capability value", may be applied to SCell.

(4) In each of the above-described determining methods, a time length for which the maximum number of blind decoding processes or the maximum number of CCEs are applied may be set according to different rules.

Hereinafter, rule 1, rule 2, and rule 3 will be described as an example of a rule related to a time length for which the maximum number of blind decoding processes or the maximum number of CCEs are applied. In the following description, it is assumed that values of the maximum number of blind decoding processes and the maximum number of CCEs per unit time are the same as those of the above-described determining methods. Also, hereinafter, a specific example of the maximum number of blind decoding processes will be described, and the same applies to the maximum number of CCEs.

<Rule 1>

In rule 1, it is assumed that a time length for which the maximum number of blind decoding processes or the maximum number of CCEs are applied is the slot length of the SCS of a CC to be scheduled.

FIG. 24 shows, for example, a case where rule 1 is applied to the example (for example, see FIG. 15) described in Condition (1) "the number of CCs is less than or equal to four or the number of CCs is less than or equal to a blind decoding capability value" of determining method 2-1.

Specifically, in determining method 2-1 (FIG. 15), the number of blind decoding processes for CCs to be scheduled at SCS=30 kHz in Example 1 is 88 BDs/1 ms, and, from the viewpoint of 30 kHz SCS (slot length: 0.5 ms), 88 blind decoding processes are required in two slots (1 ms). This means that, in some cases, there can be a case where 88 blind decoding processes are required within a slot (0.5 ms), and a bias of the number of blind decoding processes can occur among slots.

To provide a sufficient processing time in prospect of this bias, it is necessary to improve processing capabilities in a slot in a terminal, and the cost or power consumption of the terminal can increase. When this bias is allowed, there is such a merit that it is possible to improve the flexibility of scheduling of PDCCH (in other words, it is possible to further freely select the number of transmission symbols). For this reason, it is necessary to appropriately set a time length for which the maximum number of blind decoding processes or the maximum number of CCEs are applied.

In rule 1 (FIG. 24), the number of blind decoding processes for CCs to be scheduled at SCS=30 kHz in Example 1 is 44 BDs/0.5 ms, and, from the viewpoint of 30 kHz SCS (slot length: 0.5 ms), 44 blind decoding processes are required within each slot (0.5 ms). In other words, the number of blind decoding processes per unit time in rule 1 is the same as that of determining method 2-1 (88 BDs/1 ms), and it is possible to reduce a bias of the number of blind decoding processes among slots. Thus, improvement in processing capabilities in a slot in terminal 100 is not required, so it is possible to suppress an increase in the cost or power consumption of a terminal.

In this way, in rule 1, it is possible to appropriately set the maximum number of blind decoding processes and the maximum number of CCEs in accordance with the slot length of a CC to be scheduled.

<Rule 2>

In rule 2, it is assumed that a time length for which the maximum number of blind decoding processes or the maximum number of CCEs are applied is the slot length of the SCS of a scheduling CC.

FIG. 25 shows, for example, a case where rule 2 is applied to the example (for example, see FIG. 15) described in Condition (1) "the number of CCs is less than or equal to four or the number of CCs is less than or equal to a blind decoding capability value" of determining method 2-1.

Specifically, in determining method 2-1 (FIG. 15), the number of blind decoding processes for CCs to be scheduled at SCS=15 kHz in Example 2 is 88 BDs/1 ms; whereas, in rule 2 (FIG. 25), the number of blind decoding processes for CCs to be scheduled at SCS=15 kHz in Example 2 is 44 BDs/0.5 ms. Here, the number of blind decoding processes per unit time in rule 2 (44 BDs/0.5 ms) is the same as that of determining method 2-1 (88 BDs/1 ms).

As shown in FIG. 25, according to rule 2, the number of blind decoding processes for any of CCs to be scheduled is a slot length corresponding to the SCS of a scheduling CC. Specifically, in FIG. 25, in Example 1, a time length for which the number of blind decoding processes for CCs to be scheduled is applied is a slot length (1 ms) corresponding to the SCS of a scheduling CC=15 kHz. Similarly, in FIG. 25, in Example 2, a time length for which the number of blind decoding processes for CCs to be scheduled is applied is a slot length (0.5 ms) corresponding to the SCS of a scheduling CC=30 kHz.

According to rule 2, it is possible to adjust the maximum number of blind decoding processes and the maximum number of CCEs for a PDCCH addressed to each of CCs to be scheduled to the slot length of the SCS in a scheduling CC on which the PDCCH is arranged. Thus, it is possible to appropriately set the maximum number of blind decoding processes and the maximum number of CCEs in accordance with the slot length of the SCS of a scheduling CC in rule 2.

<Rule 3>

In rule 3, it is assumed that a time length for which the maximum number of blind decoding processes or the maximum number of CCEs are applied is the slot length of the lowest SCS of CCs to be scheduled by a scheduling CC.

FIG. 26 shows, for example, a case where rule 3 is applied to the example (for example, see FIG. 15) described in Condition (1) "the number of CCs is less than or equal to four or the number of CCs is less than or equal to a blind decoding capability value" of determining method 2-1.

Specifically, in determining method 2-1 (FIG. 15), the number of blind decoding processes for a CC to be scheduled at SCS=30 kHz in Example 2 is 36 BDs/0.5 ms; whereas, in rule 3 (FIG. 26), the number of blind decoding processes for a CC to be scheduled at SCS=30 kHz in Example 2 is 72 BDs/1 ms. Here, the number of blind decoding processes per unit time in rule 3 (72 BDs/1 ms) is the same as that of determining method 2-1 (36 BDs/0.5 ms).

In this way, in rule 3, it is possible to improve the flexibility of scheduling of PDCCH by adjusting the slot length, for which the maximum number of blind decoding processes and the maximum number of CCEs are applied, to the slot length of the lowest SCS (in other words, the longest slot length).

The cases where rule 1, rule 2, and rule 3 are applied to determining method 2-1 (FIG. 15) are described, and rule 1, rule 2, and rule 3 may be applied to the determining methods other than determining method 2-1. A time length may be changed and then, as described in (2), the maximum number of blind decoding processes or the maximum number of CCEs for each of different SCSs may be consolidated (added up) as the single maximum number of blind decoding processes or the single maximum number of CCEs.

(5) When self-scheduling and cross-carrier scheduling are mixedly present, the maximum number of blind decoding processes and the maximum number of CCEs may be determined in accordance with the following procedure.

<Condition (1): The Number of CCs is Less Than or Equal to Four or the Number of CCs is Less Than or Equal to a Blind Decoding Capability Value>

The maximum number of blind decoding processes and the maximum number of CCEs are determined for self-scheduling and cross-carrier scheduling individually.

In Condition (1), the maximum number of blind decoding processes and the maximum number of CCEs are determined for each CC in self-scheduling and determined for each scheduling CC in cross-carrier scheduling, so there is no influence of a mixture of self-scheduling and cross-carrier scheduling on determining the maximum number of blind decoding processes and the maximum number of CCEs.

<Condition (2): The Number of CCs is Greater Than Four and the Number of CCs is Greater Than a Blind Decoding Capability Value>

[Method 1]

In method 1, terminal 100 and base station 200 determine the maximum number of blind decoding processes and the maximum number of CCEs for self-scheduling and for cross-carrier scheduling individually, and apply the determined maximum number of blind decoding processes and the determined maximum number of CCEs to the corresponding scheduling.

For example, in cross-carrier scheduling, the maximum number of blind decoding processes and the maximum number of CCEs are determined based on the determining methods described in the above embodiment.

On the other hand, in self-scheduling, terminal 100 and base station 200 determine the maximum number of blind decoding processes and the maximum number of CCEs for self-scheduling CCs (total values for self-scheduling CCs) at each SCS in accordance with, for example, the following expression 16.

$$\text{Floor}\{Xi/T*(Mi \text{ or } Ni)*y\} \quad \text{(Expression 16)}$$

where

Floor{ }: floor function

Xi: the number of CCs for self-scheduling (which does not include the number of CCs in cross-carrier scheduling) at SCS i, allocated to terminal 100.

T: the number of all CCs allocated to the terminal

Mi: the maximum number of blind decoding processes in non-CA at SCS i (see, for example, FIG. 2)

Ni: the maximum number of CCEs in non-CA at SCS i (see, for example, FIG. 3)

i: the SCS number of the SCS of a CC allocated to terminal 100

In this way, in method 1, the maximum number of blind decoding processes and the maximum number of CCEs are set for each of self-scheduling and cross-carrier scheduling. Thus, terminal 100 and base station 200 just need to manage the number of blind decoding processes and the number of CCEs in each of self-scheduling and cross-carrier scheduling, so management is easy.

[Method 2]

In method 2, terminal 100 and base station 200 determine the maximum number of blind decoding processes and the maximum number of CCEs for each of self-scheduling and for cross-carrier scheduling individually, and add up the determined maximum numbers of blind decoding processes and the determined maximum numbers of CCEs, respectively. In other words, in method 2, the single maximum number of blind decoding processes and the single maximum number of CCEs are set for self-scheduling and cross-carrier scheduling in total.

The determining method for the maximum number of blind decoding processes and the maximum number of CCEs in self-scheduling and cross-carrier scheduling is similar to that of method 1.

Terminal 100 and base station 200, for example, add up the maximum numbers of blind decoding processes (or the maximum numbers of CCEs) calculated in self-scheduling and cross-carrier scheduling, respectively.

When a scheduling CC is an SCell (Secondary Cell), base station 200 may ensure that total values do not exceed the maximum number of blind decoding processes and the maximum number of CCEs under Condition (1) "the number of CCs is less than or equal to four and the number of CCs is less than or equal to a blind decoding capability value".

In the case where a scheduling CC is a PCell (Primary Cell) or a PSCell (Primary Secondary Cell), when total values have reached the maximum number of blind decoding processes and the maximum number of CCEs under Condition (2) "the number of CCs is greater than four and the number of CCs is greater than a blind decoding capability value", search spaces may be mapped in order defined by, for example, a mapping rule. The order defined by a mapping rule may be, for example, the order in which a common search space is given a higher priority over a UE specific search space and, within the UE specific search space, a space having a lower search space ID is given a higher priority.

In this way, in method 2, the single maximum number of blind decoding processes and the single maximum number of CCEs are set for self-scheduling and cross-carrier scheduling in total, so it is possible to improve the flexibility of scheduling of PDCCH.

(6) In the determining methods of the above-described embodiment, the case where the maximum number of blind decoding processes and the maximum number of CCEs are determined regardless of whether a CC to be scheduled is a scheduling CC or a scheduled CC is described.

In contrast, for example, in order for a larger amount of PDCCHs to be allocated to a scheduling CC, an allocation to a scheduling CC (or the SCS of a scheduling CC) may be increased as compared to a scheduled CC at the time of determining the maximum number of blind decoding processes and the maximum number of CCEs.

For example, in Condition (2) "the number of CCs is greater than four and the number of CCs is greater than a blind decoding capability value" of determining method 2-1 (see, for example, the expression 7 and FIG. 16), the following expression 17 is applied.

$$\text{Floor}\{y*(Xi/(T+\beta))*(Mj \text{ or } Nj)\} \quad \text{(Expression 17)}$$

where

Floor{ }: floor function y: blind decoding capability value

Xi: the number of CCs to be scheduled at SCS i where the SCS of a scheduling CC is added with $\beta$ T: the number of all CCs allocated to a terminal Mj: the maximum number of blind decoding processes in non-CA at SCS j (see, for example, FIG. 2)

Nj: the maximum number of CCEs in non-CA at SCS j (see, for example, FIG. 3)

i: the SCS number of the SCS of a CC to be scheduled j: when the SCS(i) of a CC to be scheduled is higher than the SCS of a scheduling CC, the SCS number of the scheduling CC when the SCS of a CC to be scheduled is not higher than the SCS of the scheduling CC, the SCS number of the CC to be scheduled (j=i)

β: allocation adjustment variable

FIG. 27 shows an example of calculation of the maximum number of blind decoding processes based on the expression 17.

FIG. 27, as in the case of determining method 2-1 (see FIG. 16), shows the number of blind decoding processes (for example, the maximum number of blind decoding processes) in each of the case where the SCS of one scheduling CC=15 kHz, the SCS of five scheduled CCs=30 kHz, and the blind decoding capability value y=4 (Example 1) and the case where the SCS of one scheduling CC=30 kHz, the SCS of five scheduled CCs=15 kHz, and the blind decoding capability value y=4 (Example 2). In FIG. 27, β=1.

In FIG. 27, originally, the ratio between the number of scheduling CCs and the number of scheduled CCs is 1 to 5; whereas, according to the expression 17, the ratio between the number of scheduling CCs and the number of scheduled CCs is adjusted to 2 to 5. In other words, originally, the proportion of scheduling CCs to all is 1/6; whereas, according to the expression 17, the proportion of scheduling CCs to all becomes 2/7. In this way, in FIG. 27, the allocation of the maximum number of blind decoding processes to scheduling CCs increases as compared to FIG. 16.

The maximum number of blind decoding processes is described with reference to FIG. 27, and the same applies to the maximum number of CCEs.

Thus, a larger amount of PDCCHs can be allocated to scheduling CCs.

(7) Parameters such as SCS (or the value of μ), the number of CCs, blind decoding capability value y, coefficient α, and allocation adjustment variable β are examples and not limited to values used in the description of the above-described embodiment, and may be other values.

(8) A component carrier (CC) may be called Cell.

(9) The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples."

A terminal according to one exemplary embodiment of the present disclosure includes: control circuitry, which, in operation, when scheduling information for each of a first component carrier (CC) and a second CC is indicated on the first CC, determines a maximum number of blind decoding processes in blind-decoding the scheduling information based on, of the first CC and the second CC, a sub-carrier spacing of a CC to be scheduled in accordance with the scheduling information; and reception circuitry, which, in operation, extracts the scheduling information by blind-decoding the scheduling information based on the maximum number of blind decoding processes.

In the terminal according to one exemplary embodiment of the present disclosure, the control circuitry determines the maximum number of blind decoding processes for the CC to be scheduled, by using a number of blind decoding processes associated with the sub-carrier spacing of the CC to be scheduled.

In the terminal according to one exemplary embodiment of the present disclosure, as the sub-carrier spacing increases, a number of blind decoding processes per unit time associated with the sub-carrier spacing, increases; and the control circuitry determines the maximum number of blind decoding processes by using a number of times less than or equal to the number of blind decoding processes associated with the sub-carrier spacing of the CC to be scheduled.

In the terminal according to one exemplary embodiment of the present disclosure, when the sub-carrier spacing of the CC to be scheduled is higher than a sub-carrier spacing of the first CC, the control circuitry determines the maximum number of blind decoding processes for the CC to be scheduled, by using a number of blinding decoding processes associated with the sub-carrier spacing of the first CC; and when the sub-carrier spacing of the CC to be scheduled is not higher than the sub-carrier spacing of the first CC, the control circuitry determines the maximum number of blind decoding processes for the CC to be scheduled, by using the number of blind decoding processes associated with the sub-carrier spacing of the CC to be scheduled.

In the terminal according to one exemplary embodiment of the present disclosure, the control circuitry determines the maximum number of blind decoding processes by using a number of blind decoding processes associated with a lower one of a sub-carrier spacing of the first CC and the sub-carrier spacing of the CC to be scheduled.

In the terminal according to one exemplary embodiment of the present disclosure, the control circuitry determines the maximum number of blind decoding processes by using a number of blind decoding processes associated with a lowest one of sub-carrier spacings of a plurality of the CCs to be scheduled.

In the terminal according to one exemplary embodiment of the present disclosure, when the sub-carrier spacing of the CC to be scheduled is higher than a sub-carrier spacing of the first CC, the control circuitry determines the maximum number of blind decoding processes for the CC to be scheduled, by using a value obtained by multiplying a coefficient less than one by the number of blind decoding processes associated with the sub-carrier spacing of the CC to be scheduled; and when the sub-carrier spacing of the CC to be scheduled is not higher than the sub-carrier spacing of the first CC, the control circuitry determines the maximum number of blind decoding processes for the CC to be scheduled, by using the number of blind decoding processes associated with the sub-carrier spacing of the CC to be scheduled.

A communication method according to one exemplary embodiment of the present disclosure includes: when scheduling information for each of a first component carrier (CC) and a second CC is indicated on the first CC, determining a maximum number of blind decoding processes in blind-decoding the scheduling information based on, of the first CC and the second CC, a sub-carrier spacing of a CC to be scheduled in accordance with the scheduling information; and extracting the scheduling information by blind-decoding the scheduling information based on the maximum number of blind decoding processes.

The disclosure of Japanese Patent Application No. 2018-149914, filed Aug. 9, 2018, including the specification, drawings, and abstract, is incorporated herein by reference in its entirety.

INDUSTRIAL APPLICABILITY

One embodiment of the present disclosure is useful in mobile communication systems.

REFERENCE SIGNS LIST

100 Terminal
101, 201 Receiver
102 Extractor
103, 202 Demodulator/decoder
104, 204 Control information holder
105, 205 Limit determiner
106 Signaling information generator
107, 208 Encoder/modulator
108, 209 Transmitter
200 Base station
203 CC allocator
206 Scheduler
207 Control information generator

The invention claimed is:

1. A terminal, comprising:
control circuitry, which, in operation, when scheduling information for a first component carrier (CC) and a second CC is indicated on the first CC, determines a number of blind decoding processes in blind-decoding the scheduling information for the second CC based on (i) a sub-carrier spacing (SCS) of the second CC, the SCS of the second CC being different from a SCS of the first CC, and (ii) a number of the second CCs; and
reception circuitry, which, in operation, extracts the scheduling information by blind-decoding the scheduling information for the second CC based on the number of blind decoding processes.

2. The terminal according to claim 1, wherein the control circuitry determines the number of blind decoding processes for the second CC, by using a number of blind decoding processes associated with the SCS of the second CC.

3. The terminal according to claim 1, wherein:
as the SCS of the second CC increases, a number of blind decoding processes per unit time associated with the SCS of the second CC increases; and
the control circuitry determines the number of blind decoding processes for the second CC by using a number of times less than or equal to the number of blind decoding processes associated with the SCS of the second CC.

4. The terminal according to claim 3, wherein:
when the SCS of the second CC is higher than the SCS of the first CC, the control circuitry determines the number of blind decoding processes for the second CC, by using a number of blinding decoding processes associated with the SCS of the first CC; and
when the SCS of the second CC is not higher than the SCS of the first CC, the control circuitry determines the number of blind decoding processes for the second CC, by using the number of blind decoding processes associated with the SCS of the second CC.

5. The terminal according to claim 3, wherein the control circuitry determines the number of blind decoding processes by using a number of blind decoding processes associated with a lower one of the SCS of the first CC and the SCS of the second CC.

6. The terminal according to claim 3, wherein the control circuitry determines the number of blind decoding processes by using a number of blind decoding processes associated with a lowest one of the SCSs of a plurality of the CCs including the first CC and the second CC.

7. The terminal according to claim 3, wherein:
when the SCS of the second CC is higher than the SCS of the first CC, the control circuitry determines the number of blind decoding processes for the second CC, by using a value obtained by multiplying a coefficient less than one by the number of blind decoding processes associated with the SCS of the second CC; and
when the SCS of the second CC is not higher than the SCS of the first CC, the control circuitry determines the number of blind decoding processes for the second CC, by using the number of blind decoding processes associated with the SCS of the second CC.

8. A communication method, comprising:
when scheduling information for a first component carrier (CC) and a second CC is indicated on the first CC, determining a number of blind decoding processes in blind-decoding the scheduling information for the second CC based on (i) a sub-carrier spacing (SCS) of the second CC, the SCS of the second CC being different from a SCS of the first CC, and (ii) a number of the second CCs; and
extracting the scheduling information by blind-decoding the scheduling information for the second CC based on the number of blind decoding processes.

9. A base station, comprising:
receiver, which, in operation, receives signaling information related to a number of blind decoding process of a terminal;
circuitry, which, in operation, determines (1) component carrier (CC) allocation information for a first component carrier (CC) and a second CC based on the signaling information and (2) a number of blind decoding processes in blind-decoding the scheduling information for the second CC based on (i) a sub-carrier spacing (SCS) of the second CC, the SCS of the second CC being different from a SCS of the first CC, and (ii) a number of the second CCs; and
transmitter, which, in operation, transmits the CC allocation information and scheduling information to the terminal, the scheduling information being blind decoded by the terminal based on the number of blind decoding processes.

10. A communication method, comprising:
receiving signaling information related to a number of blind decoding process of a terminal;
determining (1) component carrier (CC) allocation information for a first component carrier (CC) and a second CC based on the signaling information and (2) a number of blind decoding processes in blind-decoding the scheduling information for the second CC based on (i) a sub-carrier spacing (SCS) of the second CC, the SCS of the second CC being different from a SCS of the first CC, and (ii) a number of the second CCs; and
transmitting the CC allocation information and scheduling information to the terminal, the scheduling information being blind decoded by the terminal based on the number of blind decoding processes.

* * * * *